(12) United States Patent
Levitsky et al.

(10) Patent No.: US 12,323,350 B2
(45) Date of Patent: Jun. 3, 2025

(54) TECHNIQUES FOR DYNAMIC ADAPTATION OF SOUNDING REFERENCE SIGNAL TIME DOMAIN PARAMETERS

(71) Applicant: QUALCOMM Incorporated, San Diego, CA (US)

(72) Inventors: Michael Levitsky, Rehovot (IL); Muhammad Sayed Khairy Abdelghaffar, San Jose, CA (US); Daniel Paz, Geva Carmel (IL)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 17/808,183

(22) Filed: Jun. 22, 2022

(65) Prior Publication Data

US 2023/0421320 A1 Dec. 28, 2023

(51) Int. Cl.
*H04W 72/04* (2023.01)
*H04L 5/00* (2006.01)
*H04L 27/26* (2006.01)
*H04W 72/23* (2023.01)
*H04W 76/00* (2018.01)
*H04W 88/08* (2009.01)

(52) U.S. Cl.
CPC .......... *H04L 5/0048* (2013.01); *H04L 5/0092* (2013.01); *H04L 27/261* (2013.01); *H04W 72/23* (2023.01)

(58) Field of Classification Search
CPC ... H04L 5/0048; H04L 5/0092; H04L 27/261; H04L 5/0096; H04L 5/0051; H04W 72/23

USPC ........................................................ 370/329
See application file for complete search history.

(56) References Cited

U.S. PATENT DOCUMENTS

| 2021/0336820 A1 | 10/2021 | Lim et al. |
| 2022/0368485 A1 | 11/2022 | Levitsky et al. |

(Continued)

FOREIGN PATENT DOCUMENTS

| EP | 4106250 A1 | 12/2022 |
| WO | WO-2021162496 A1 | 8/2021 |

(Continued)

OTHER PUBLICATIONS

International Search Report and Written Opinion—PCT/US2023/023726—ISA/EPO—Sep. 8, 2023.

*Primary Examiner* — Maharishi V Khirodhar
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive a sounding reference signal (SRS) configuration for SRS resources included an SRS resource set. The SRS configuration includes one or more first time domain parameters for the SRS resources. The UE may receive a dynamic indication of one or more second time domain parameters for the SRS resources. At least a subset of the one or more second time domain parameters are modified from the one or more first time domain parameters included in the SRS configuration. The UE may transmit, based at least in part on the one or more second time domain parameters, an SRS using the SRS resources. Numerous other aspects are described.

26 Claims, 13 Drawing Sheets

(56) References Cited

U.S. PATENT DOCUMENTS

2023/0017408 A1      1/2023   Levitsky et al.
2023/0269043 A1 *    8/2023   Matsumura .......... H04L 5/0053
                                                              370/329

FOREIGN PATENT DOCUMENTS

WO      WO-2022029899 A1      2/2022
WO      WO-2023203677 A1 *   10/2023

* cited by examiner

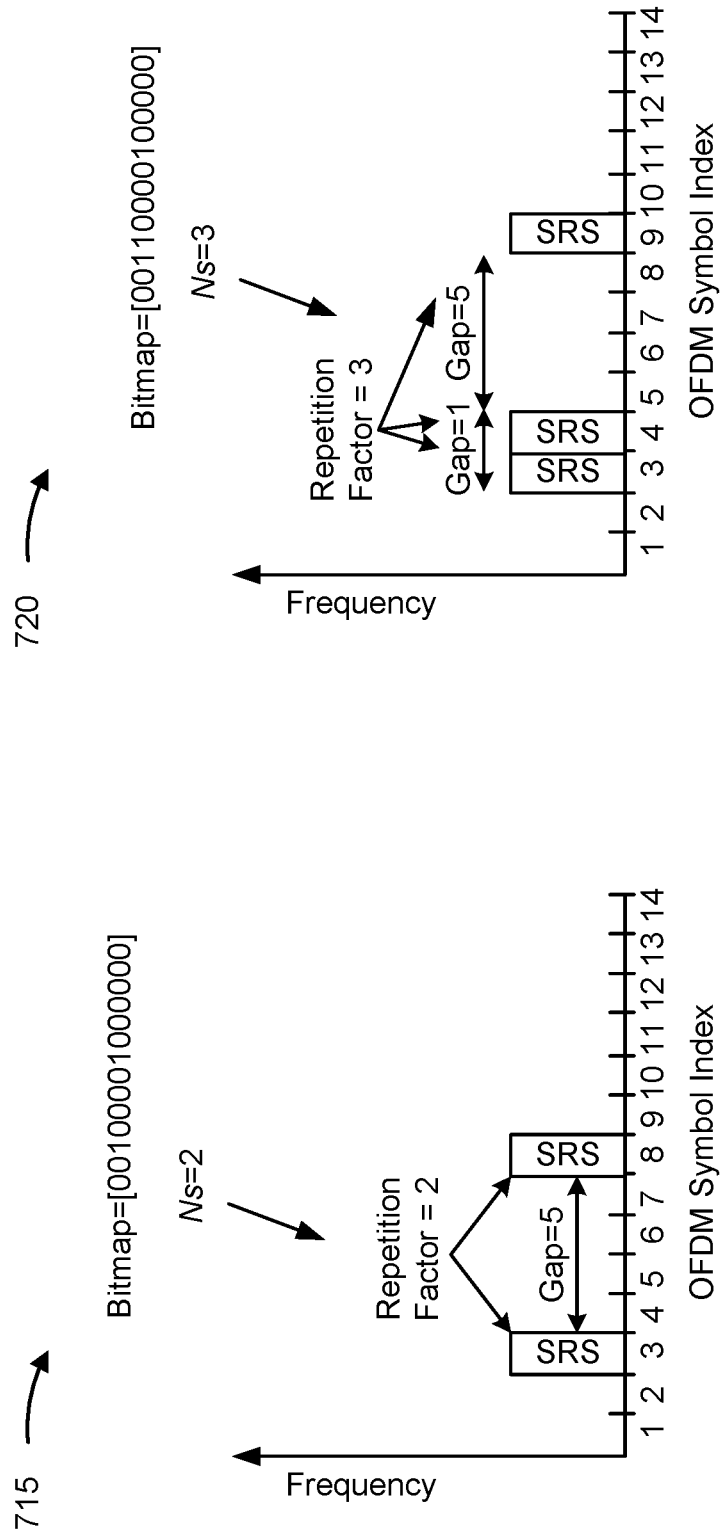

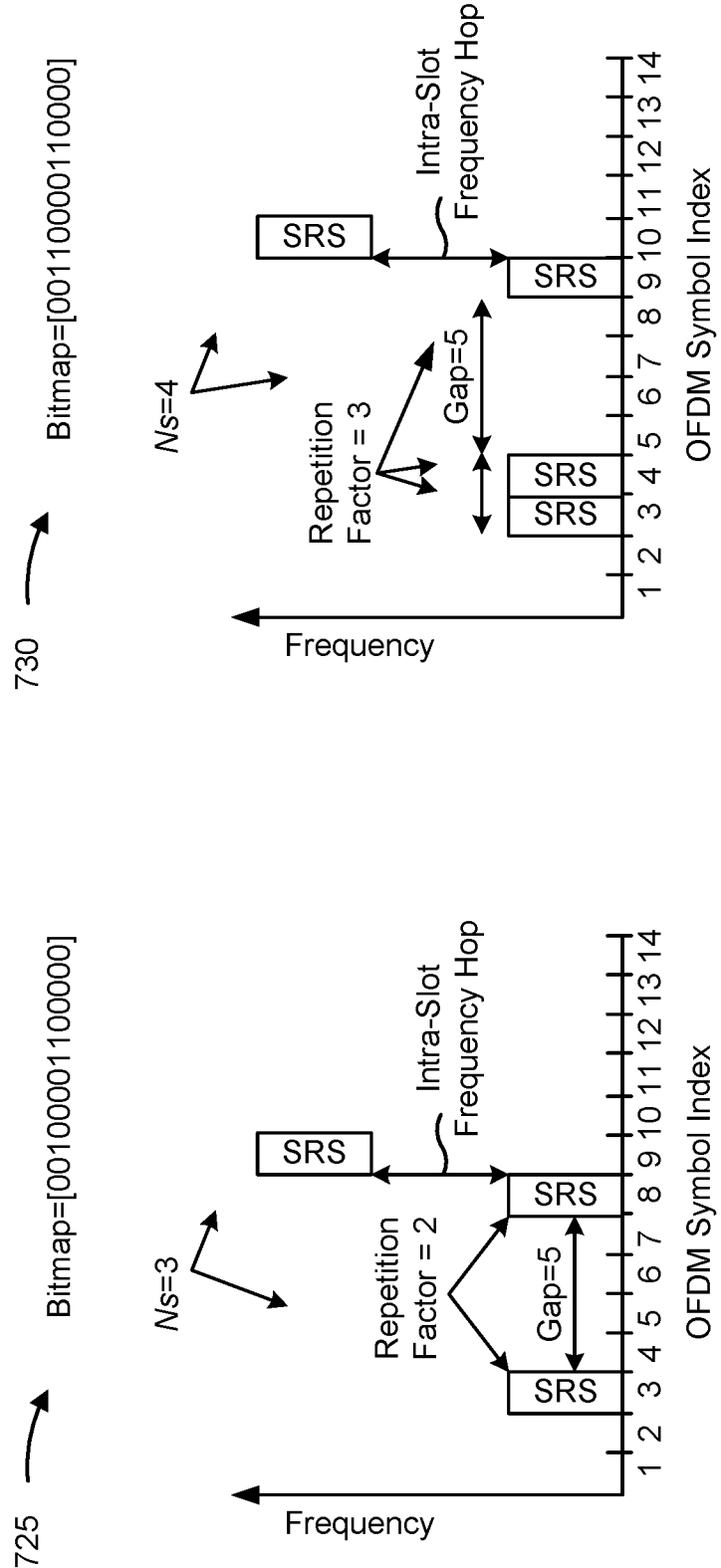

TECHNIQUES FOR DYNAMIC ADAPTATION OF SOUNDING REFERENCE SIGNAL TIME DOMAIN PARAMETERS

FIELD OF THE DISCLOSURE

Aspects of the present disclosure generally relate to wireless communication and to techniques and apparatuses for dynamic adaptation of sounding reference signal time domain parameters.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a sounding reference signal (SRS) configuration for SRS resources included in an SRS resource set, where the SRS configuration includes one or more first time domain parameters for the SRS resources. The method may include receiving a dynamic indication of one or more second time domain parameters for the SRS resources, where at least a subset of the one or more second time domain parameters are modified from the one or more first time domain parameters included in the SRS configuration. The method may include transmitting, based at least in part on the one or more second time domain parameters, an SRS using the SRS resources.

Some aspects described herein relate to a method of wireless communication performed by a network node. The method may include transmitting, to a UE, an SRS configuration for SRS resources included in an SRS resource set, where the SRS configuration includes one or more first time domain parameters for the SRS. The method may include transmitting, to the UE, a dynamic indication of one or more second time domain parameters for the SRS resources, where at least a subset of the one or more second time domain parameters are modified from the one or more first time domain parameters included in the SRS configuration. The method may include receiving, from the UE and based at least in part on the one or more second time domain parameters, an SRS in the SRS resources.

Some aspects described herein relate to a UE for wireless communication. The UE may include a memory and one or more processors coupled to the memory. The one or more processors may be configured to receive an SRS configuration for SRS resources included in an SRS resource set. The one or more processors may be configured to receive a dynamic indication of one or more second time domain parameters for the SRS resources. The one or more processors may be configured to transmit, based at least in part on the one or more second time domain parameters, an SRS using the SRS resources.

Some aspects described herein relate to a network node for wireless communication. The network node may include a memory and one or more processors coupled to the memory. The one or more processors may be configured to transmit, to a UE, an SRS configuration for SRS resources included in an SRS resource set. The one or more processors may be configured to transmit, to the UE, a dynamic indication of one or more second time domain parameters for the SRS resources. The one or more processors may be configured to receive, from the UE and based at least in part on the one or more second time domain parameters, an SRS in the SRS resources.

Some aspects described herein relate to a non-transitory computer-readable medium that stores a set of instructions for wireless communication by a UE. The set of instructions, when executed by one or more processors of the UE, may cause the UE to receive an SRS configuration for SRS resources in an SRS resource set. The set of instructions, when executed by one or more processors of the UE, may cause the UE to receive a dynamic indication of one or more second time domain parameters for the SRS resources. The set of instructions, when executed by one or more processors of the UE, may cause the UE to transmit, based at least in part on the one or more second time domain parameters, an SRS using the SRS resources.

Some aspects described herein relate to a non-transitory computer-readable medium that stores a set of instructions for wireless communication by a network node. The set of instructions, when executed by one or more processors of the network node, may cause the network node to transmit, to a UE, an SRS configuration for SRS resources included in an SRS resource set. The set of instructions, when executed by one or more processors of the network node, may cause the network node to transmit, to the UE, a dynamic indication of one or more second time domain parameters for the SRS resources. The set of instructions, when executed by one or more processors of the network node, may cause the network node to receive, from the UE and based at least in part on the one or more second time domain parameters, an SRS in the SRS resources.

Some aspects described herein relate to an apparatus for wireless communication. The apparatus may include means for receiving an SRS configuration for SRS resources included in an SRS resource set, where the SRS configuration includes one or more first time domain parameters for the SRS resources. The apparatus may include means for receiving a dynamic indication of one or more second time domain parameters for the SRS resource set, where at least a subset of the one or more second time domain parameters are modified from the one or more first time domain parameters included in the SRS configuration. The apparatus may include means for transmitting, based at least in part on the one or more second time domain parameters, an SRS using the SRS resources.

Some aspects described herein relate to an apparatus for wireless communication. The apparatus may include means for transmitting, to a UE, an SRS configuration for SRS resources included in an SRS resource set, where the SRS configuration includes one or more first time domain parameters for the SRS resources. The apparatus may include means for transmitting, to the UE, a dynamic indication of one or more second time domain parameters for the SRS resources, where at least a subset of the one or more second time domain parameters are modified from the one or more first time domain parameters included in the SRS configuration. The apparatus may include means for receiving, from the UE and based at least in part on the one or more second time domain parameters, an SRS in the SRS resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A-7F are diagrams of example intra-slot time domain SRS pattern configurations, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
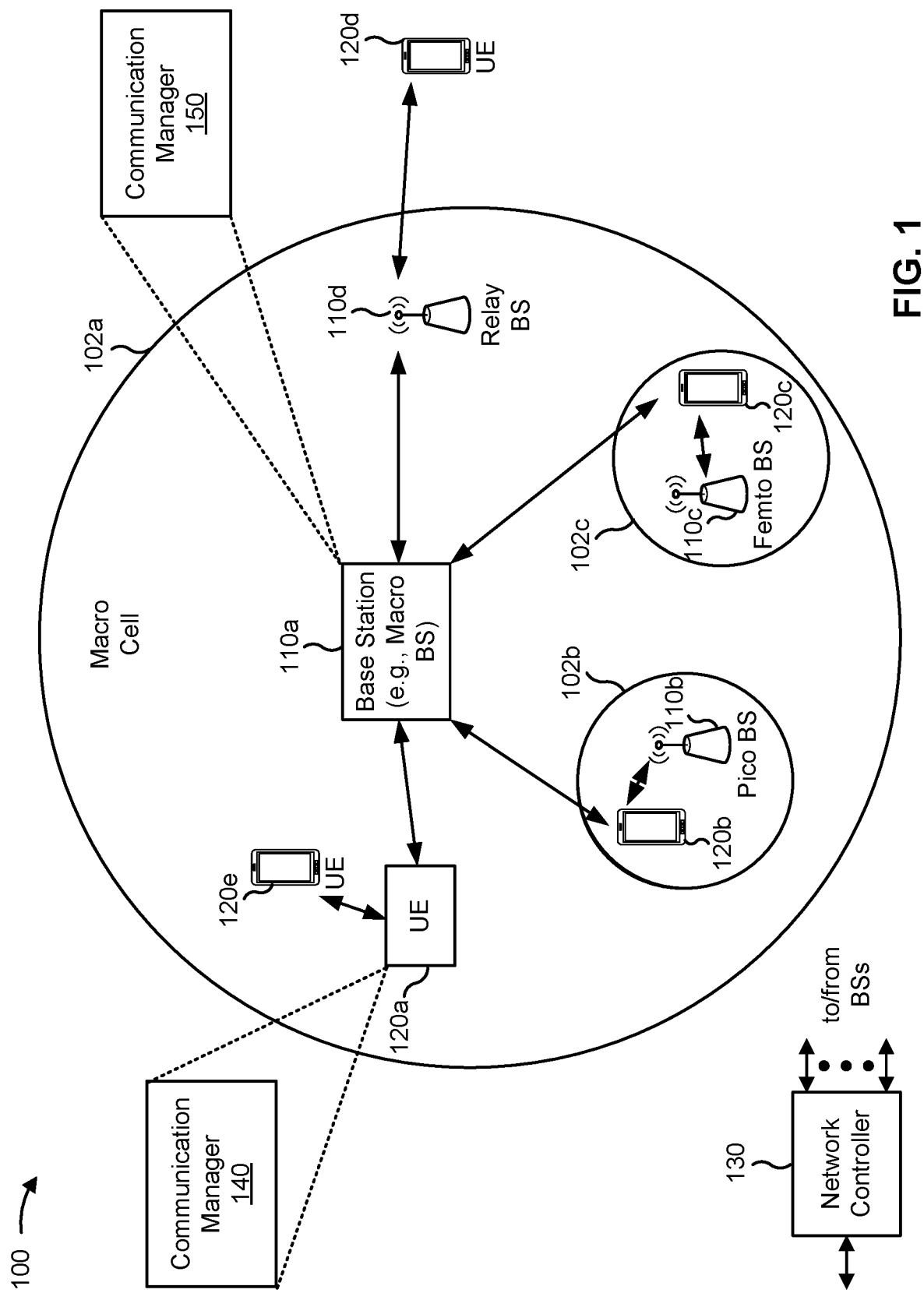
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

As described herein, a node, which may be referred to as a "node," a "network node," a "network entity," or a "wireless node," may include, be, be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote unit (RU), and/or another suitable processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be any other combination of devices or components. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the "first network node" may refer to a first UE, a first base station, a first apparatus, a first device, a first computing system, a first one or more components, a first processing entity, or the like configured to receive the information; and the "second network node" may refer to a second UE, a second base station, a second apparatus, a second device, a second computing system, a first one or more components, a first processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a sounding reference signal (SRS) configuration for an SRS resource set, wherein the SRS configuration includes one or more first time domain parameters for SRS resources included in the SRS resource set; receive a dynamic indication of one or more second time domain parameters for the SRS resources linked to the SRS resource set, wherein at least a subset of the one or more second time domain parameters are modified from the one or more first time domain parameters included in the SRS configuration; and transmit, based at least in part on the one or more second time domain parameters, an SRS using SRS resources included in the SRS resource set. Additionally, or alternatively, the communication manager 140 may perform one or more other operations described herein.

In some aspects, the base station 110 and/or another network node may include a communication manager 150. As described in more detail elsewhere herein, the communication manager 150 may transmit, to a UE, an SRS configuration for an SRS resource set, wherein the SRS configuration includes one or more first time domain parameters for the SRS resource set; transmit, to the UE, a dynamic indication of one or more second time domain parameters for the SRS resource set, wherein at least a subset of the one or more second time domain parameters are modified from the one or more first time domain parameters included in the SRS configuration; and receive, from the UE and based at least in part on the one or more second time domain parameters, an SRS in SRS resources included in the SRS resource set. Additionally, or alternatively, the communication manager 150 may perform one or more other operations described herein.

As indicated above, FIG. 1 is provided as an example. Other examples may differ from what is described with regard to FIG. 1.

Figure 2:
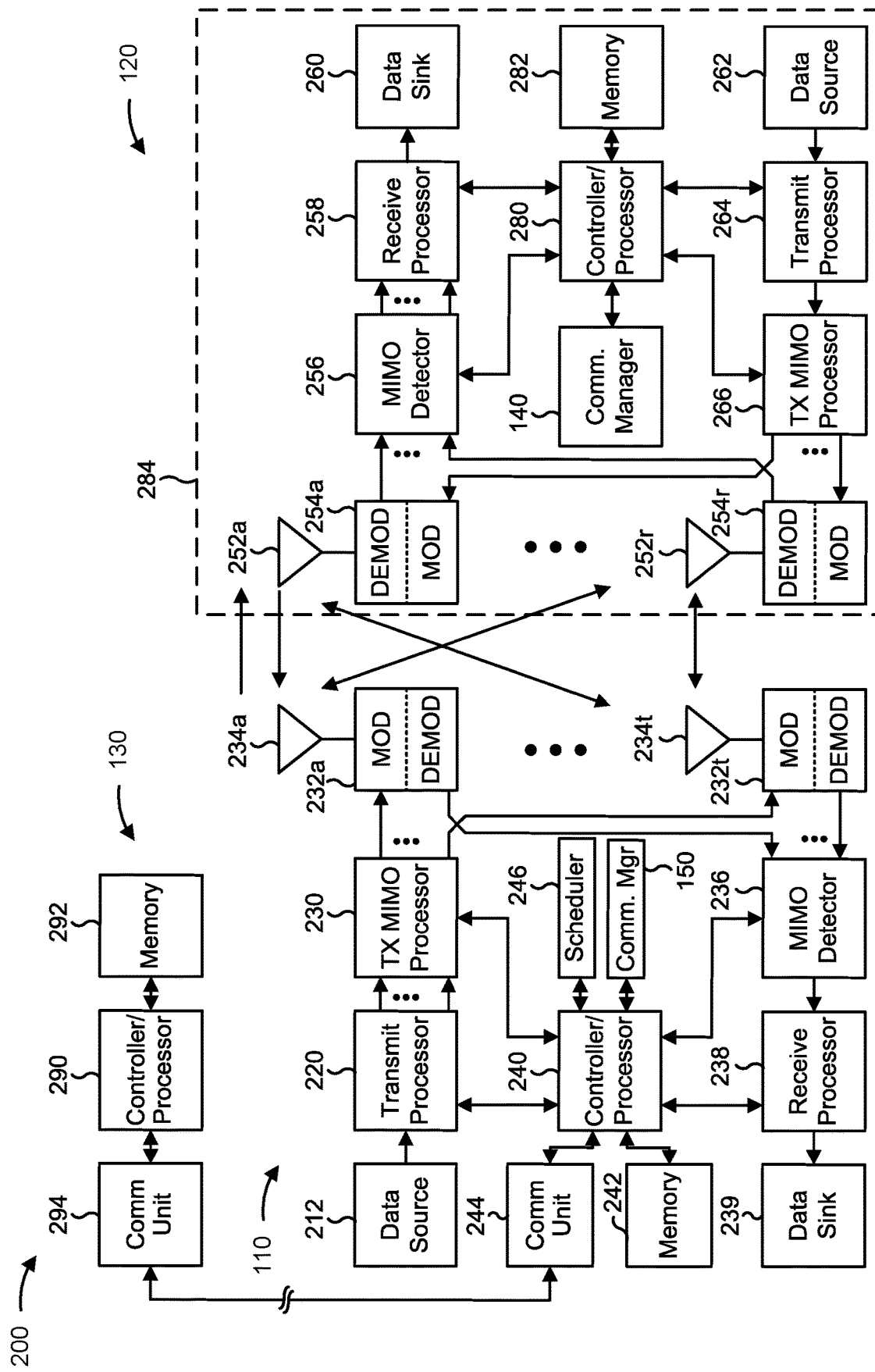
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with dynamic adaptation of SRS time domain parameters, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving an SRS configuration for SRS resources included in an SRS resource set, wherein the SRS configuration includes one or more first time domain parameters for the SRS resources; means for receiving a dynamic indication of one or more second time domain parameters for the SRS resources, wherein at least a subset of the one or more second time domain parameters are modified from the one or more first time domain parameters included in the SRS configuration; and/or means for transmitting, based at least in part on the one or more second time domain parameters, an SRS using the SRS resources included in the SRS resource set. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 and/or another type of network node includes means for transmitting, to a UE, an SRS configuration for SRS resources included in an SRS resource set, wherein the SRS configuration includes one or more first time domain parameters for the SRS resources; means for transmitting, to the UE, a dynamic indication of one or more second time domain parameters for the SRS resources, wherein at least a subset of the one or more second time domain parameters are modified from the one or more first time domain parameters included in the SRS configuration; and/or means for receiving, from the UE and based at least in part on the one or more second time domain parameters, an SRS in the SRS resources included in the SRS resource set. In some aspects, the means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)).

Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
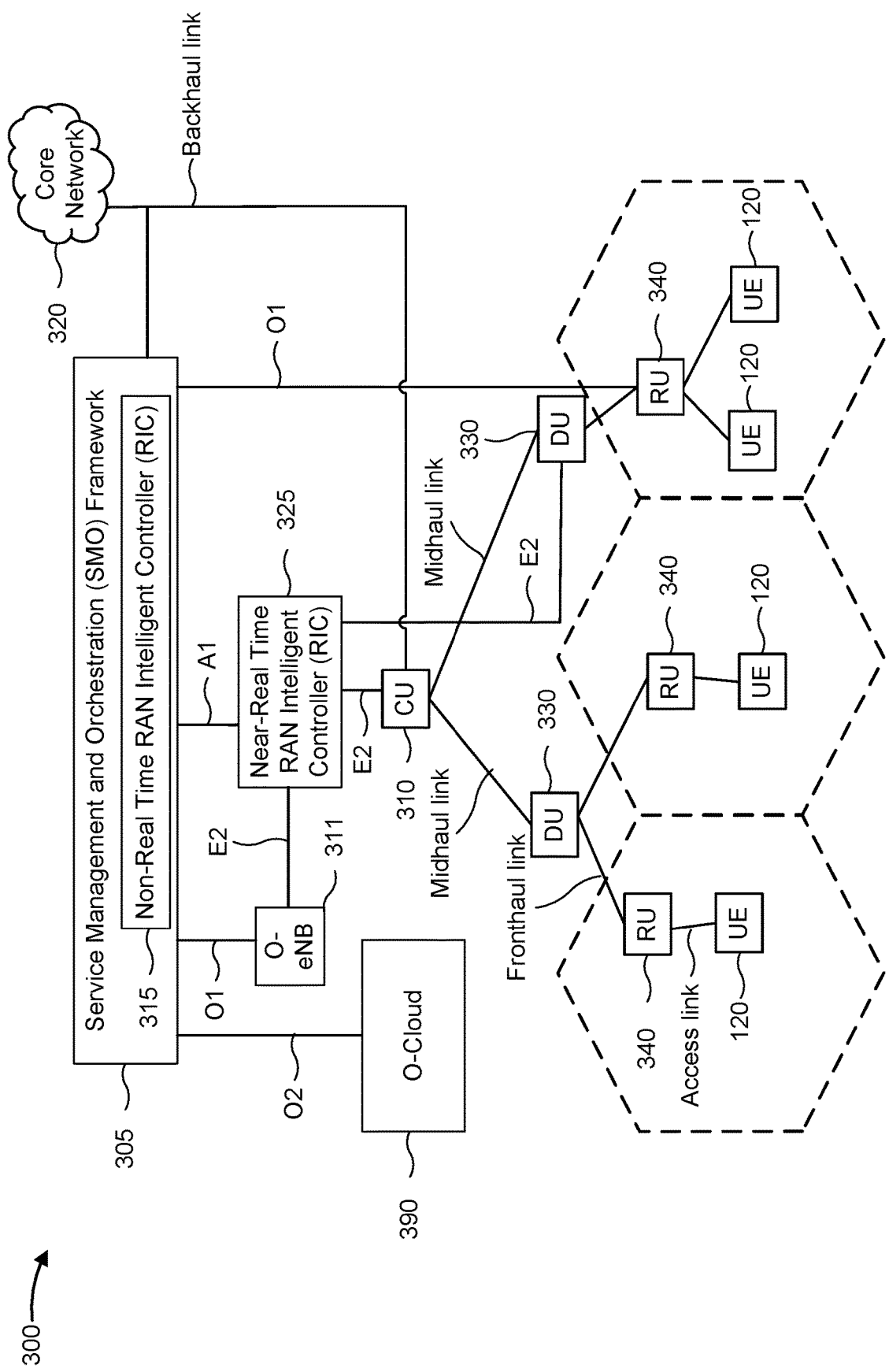
FIG. 3 is an example of a disaggregated base station architecture, in accordance with the present disclosure.

FIG. 3 is an example of a disaggregated base station architecture 300, in accordance with the present disclosure. The disaggregated base station architecture 300 shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) MC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
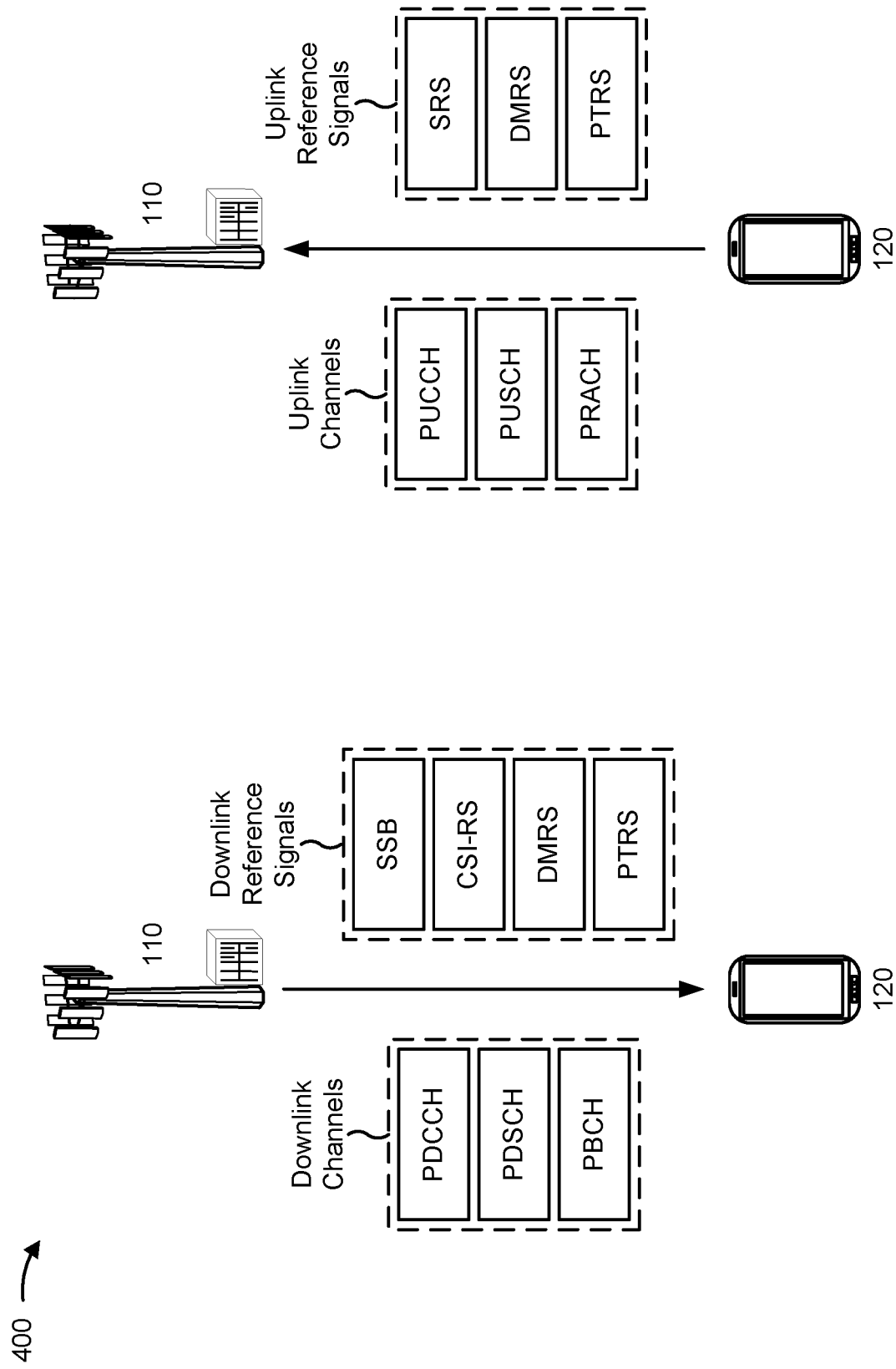
FIG. 4 is a diagram illustrating an example of physical channels and reference signals in a wireless network, in accordance with the present disclosure.

FIG. 4 is a diagram illustrating an example 400 of physical channels and reference signals in a wireless network, in accordance with the present disclosure. As shown in FIG. 4, downlink channels and downlink reference signals may carry information from a network node (e.g., described and depicted in connection with FIG. 4 as a base station 110 as an example) to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry reference signal that can be used for uplink channel estimation, which may be used for scheduling, link adaptation, precoder selection, or beam management, among other examples. The base station 110 may configure one or more SRS resource sets for the UE 120, and the UE 120 may transmit SRSs according to the configured SRS resource sets. An SRS resource set may have a configured usage, such as uplink CSI acquisition (e.g., codebook based type of SRS), downlink CSI acquisition for reciprocity-based operations (e.g., antenna switching type of SRS), non codebook based type of SRS for UE assisted UL precoding and rank determination for reciprocal DL and UL channels, uplink beam management (e.g., beam management type of SRS), among other examples. The base station 110 may measure the SRSs, may perform channel estimation based at least on the measurements, and may use the SRS measurements to configure communications with the UE 120.

Reference signals may be used to increase the reliability and efficiency of communications between wireless devices. For example, a base station 110 may measure an uplink reference signal to select a configuration or other transmission parameters for communications between the base station 110 and a UE 120. For example, the base station 110 may measure an uplink reference signal to estimate a delay spread, signal-to-noise ratio (SNR), and/or a Doppler parameter (e.g., Doppler shift or Doppler spread) associated with the uplink channel, among other examples.

"Doppler shift" refers to a shift or change in a frequency of a signal per spatial propagation path between a transmitter and a receiver. Doppler shift may sometimes be referred to as a frequency offset (e.g., in case of LOS channel). For example, Doppler shift may occur when a transmitter of a signal is moving in relation to the receiver. The relative movement between the transmitter and the receiver over a spatial propagation path may shift the frequency of the signal receiver over this spatial path, making the frequency of the signal received at the receiver different than the frequency of the signal transmitted at the transmitter. In other words, the frequency of the signal associated with a spatial propagation path that is received by the receiver differs from the frequency of the signal that was originally emitted. "Doppler spread" refers to the widening of a spectrum of a narrow-band signal transmitted through a multipath propagation channel. Doppler spread may be caused by different Doppler shifts associated with the multiple propagation paths of the channel between the transmitter and the receiver when there is relative motion between the transmitter and the receiver and/or some motion of the environment generating multipath channel. For example, when there is no relative motion between the transmitter and the receiver, due to the multipath propagation channel, the receiver can receive the same signal at different times, because one copy of the signal uses a shorter path and arrives quickly, whereas another copy of the signal may use a longer path. Where there is relative motion between the transmitter and the receiver, signals on the different paths may arrive at the receiver at different times and with different frequencies (e.g., due to different Doppler shifts associated with each path). Doppler spread may be a measure of a difference in frequencies of signals on the paths associated with the multipath propagation channel. Doppler spread may sometimes be referred to as a channel time correlation or a channel time coherency characteristic for a multipath propagation channel.

As indicated above, FIG. 4 is provided as an example. Other examples may differ from what is described with regard to FIG. 4.

Figure 5:
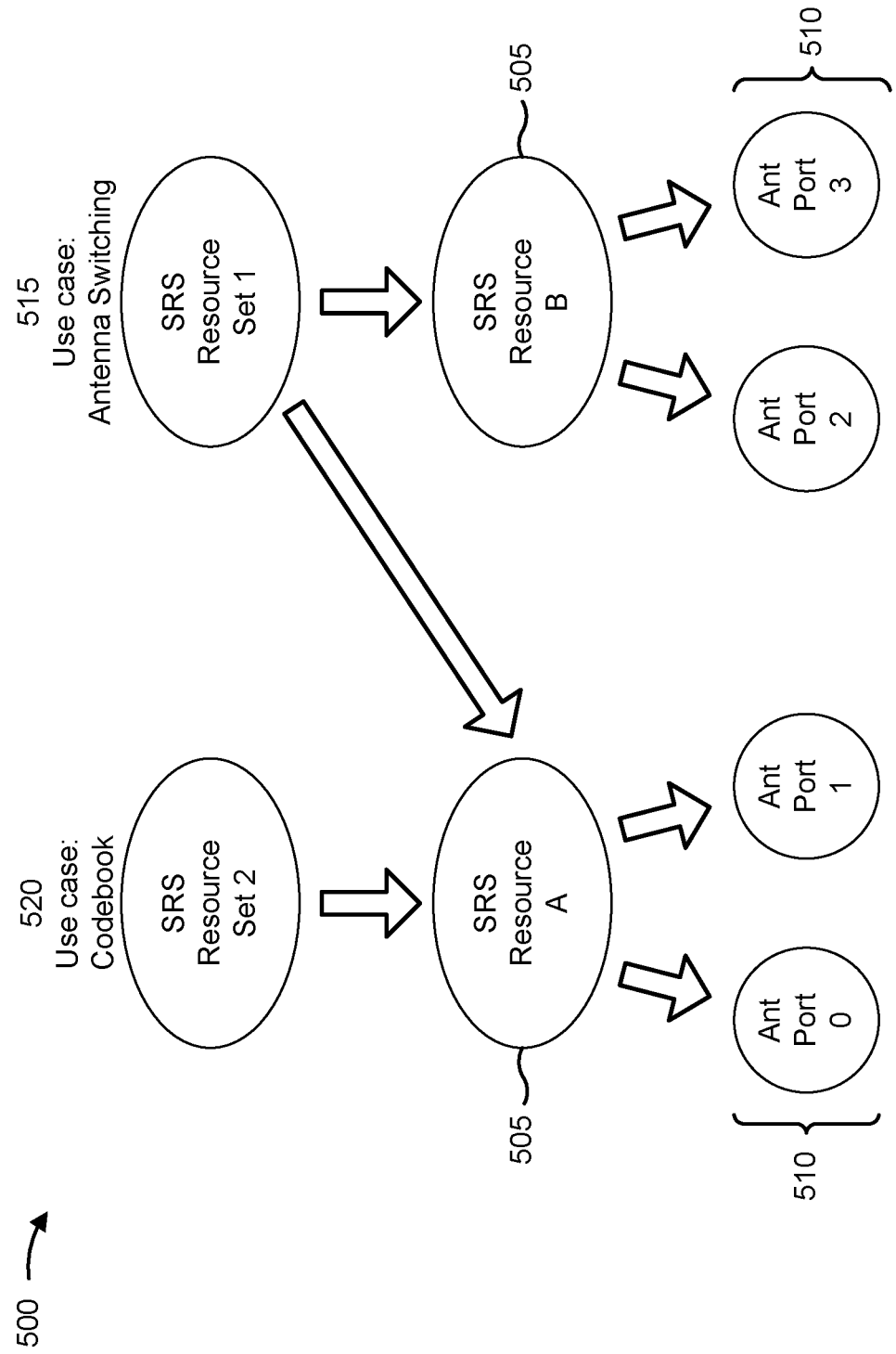
FIG. 5 is a diagram illustrating an example of sounding reference signal (SRS) resource sets, in accordance with the present disclosure.

FIG. 5 is a diagram illustrating an example 500 of SRS resource sets, in accordance with the present disclosure. A network node (e.g., depicted and described in connection with FIG. 5 as a base station 110 as an example) may configure a UE 120 with one or more SRS resource sets to allocate resources for SRS transmissions by the UE 120. For example, a configuration for SRS resource sets may be indicated in a radio resource control (RRC) communication (e.g., an RRC configuration communication or an RRC reconfiguration communication). As shown by reference number 505, an SRS resource set may include one or more resources (e.g., shown as SRS resources), which may be associated, or configured, with a different time resources and/or frequency resources (e.g., a slot, a symbol, a resource block, a resource elements subset, and/or a periodicity for the time resources).

As shown by reference number 510, an SRS resource may be configured to be associated with one or more antenna ports on which an SRS is to be transmitted (e.g., on a corresponding time-frequency resources per antenna port). Thus, a configuration for one or more SRS resources which are associated or configured with an SRS resource set may indicate one or more time-frequency resources on which an SRS is to be transmitted and may indicate one or more antenna ports using which the SRS is to be transmitted on those time-frequency resources. In some aspects, the configuration for an SRS resource set may indicate a use case (e.g., in an SRSResourceSet. Usage information element) for the SRS resource set. For example, an SRS resource set may have a use case of antenna switching, codebook, non-codebook, or beam management.

An antenna switching SRS resource set may be used to determine downlink CSI with reciprocity between an uplink and downlink channel. For example, when there is reciprocity between an uplink channel and a downlink channel, a base station 110 may use an antenna switching SRS (e.g., an SRS transmitted using SRS resources configured under one or more antenna switching SRS resource sets) to acquire downlink CSI (e.g., to determine a downlink precoder and number of spatial layers to be used to communicate with the UE 120).

A codebook SRS resource set may be used for a determination of uplink CSI when a base station 110 evaluates and indicates an uplink precoder, number of spatial layers and MCS for PUSCH to the UE 120 based on the uplink CSI. For example, when the base station 110 is configured to determine an uplink precoder to the UE 120 from the predefined set of UL precoding options (e.g., using a precoder codebook), the base station 110 may use a codebook SRS (e.g., an SRS transmitted using resources of a codebook SRS resource set) to acquire uplink CSI (e.g., to determine an uplink precoder from the codebook, number of spatial layers and MCS to be used by the UE for PUSCH transmissions to be indicated to the UE 120 and used by the UE 120 to communicate with the base station 110). In some aspects, virtual ports (e.g., a combination of two or more antenna ports for uplink precoding) that may be associated with a maximum received signal power or reception quality experienced by the base station 110 may be used for a codebook SRS.

A non-codebook SRS resource set may be used in case of a reciprocal uplink and downlink channel to assist in uplink CSI evaluation when the UE 120 pre-selects one or more arbitrary uplink precoder candidate options (e.g., instead of the base station 110 autonomously evaluating uplink precoder candidates from the codebook and selecting one to be indicated explicitly to the UE 120 for uplink precoding). For example, when the UE 120 is configured to transmit a non-codebook based SRS, the UE 120 may select one or more uplink precoder candidates based on downlink measurements and will use the one or more uplink precoder candidates for different SRS resources transmission (e.g., pre-coded SRS will be transmitted where each SRS resource will be associated with a different precoded UL layer according to uplink precoder candidates). The base station 110 may use a non-codebook SRS (e.g., an SRS transmitted using resources of a non-codebook SRS resource set) to select one of the UE selected precoder candidates and to acquire other uplink CSI parameters (rank and MCS) given the selected uplink precoder candidate. In this case, uplink transmission parameters may be indicated by the base station 110 to the UE 120 at least partially implicitly (e.g., precoding information) based on the selected non codebook SRS resource (e.g., via an SRS resource indicator (SRI)). A beam management SRS resource set may be used for uplink beam selection and/or evaluation by a base station 110 (e.g., for millimeter wave communications).

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. A periodic SRS resource set may always activated (e.g., transmitted), and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a medium access control (MAC) control element (CE) (MAC-CE)). An aperiodic SRS resource may be triggered dynamically, such as via DCI (e.g., UE-specific DCI or group common DCI).

In some examples, an aperiodic SRS resource may be triggered via an SRS request field included in a DCI communication. For example, the SRS request field may include a value (e.g., a codepoint) that is associated with an SRS trigger state. "SRS trigger state" may refer to a configuration (e.g., an RRC configuration) of a list of one or more SRS resource sets to be triggered by DCI when the DCI indicates the specific SRS trigger state (e.g., via an SRS request field in the DCI). SRS trigger states may be RRC configured by a network node (e.g., via one or more aperiodicSRS-Resource Trigger parameters). Different SRS trigger states can be indicated or selected dynamically by the base station 110 via DCI. For example, configuration information (e.g., RRC configuration information) may map or link each SRS trigger state to a codepoint for a DCI field (e.g., the SRS request field) or to another indicator. The base station 110 may include the codepoint or indicator in DCI (e.g., in an SRS request field) to dynamically trigger or select the SRS trigger state linked to or associated with an SRS resource set (or several SRS resource sets). In some examples, the configuration information may configure a linkage or association of different SRS trigger states to different SRS resource sets having different usage types, such as antenna switching, codebook, non-codebook, beam management, and/or positioning, among other examples.

In some aspects, the UE 120 may be configured with a mapping between SRS ports (e.g., antenna ports) and corresponding SRS resources (e.g., which antenna port(s) to be used for every SRS resource). The UE 120 may transmit a particular SRS resource using an SRS port indicated in the configuration. In some aspects, an SRS resource may span N adjacent symbols within a slot (e.g., where N equals 1, 2, or 4). The UE 120 may be configured with X SRS ports (e.g., where X=1, 2, 4). In some aspects, each of the X SRS ports may mapped to a corresponding symbol of the SRS resource and used for transmission of the SRS on that symbol.

As shown in FIG. 5, in some aspects, different SRS resource sets indicated to the UE 120 (e.g., having different use cases) may overlap in terms of the associated SRS resources (e.g., may be configured with one or more same SRS resource identifiers). For example, as shown by reference number 515, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS will be transmitted according to or using SRS Resource A configuration (e.g., a first time-frequency resource) using antenna port 0 and antenna port 1 and according to or using SRS Resource B configuration (e.g., a second time-frequency resource) using antenna port 2 and antenna port 3.

As shown by reference number 520, a second SRS resource set (e.g., shown as SRS Resource Set 2) may be configured for codebook use case or type. As shown, this example codebook SRS resource set includes only the first SRS resource (shown as SRS Resource A). Thus, codebook SRS may be transmitted using SRS Resource A configuration (e.g., the first time-frequency resource) via antenna port 0 and antenna port 1.

As described above, a network node (e.g., the base station 110) may configure one or more SRS resource sets. For example, the network node may configure an SRS resource set including one or more frequency domain parameters (e.g., indicating information or a configuration associated with a location and/or pattern of the SRS resources linked with the SRS resource set in the frequency domain), one or more time domain parameters (e.g., indicating information associated with a location and/or pattern of SRS resources linked with the SRS resource set in the time domain), and/or one or more spatial domain parameters, among other examples. The time domain parameters may include one or more intra-slot time domain pattern related parameters, one or more inter-slot time domain pattern related parameters, and/or one or more time domain parameters of another type.

The intra-slot time domain pattern related parameter(s) may include, for example, a resource mapping start position parameter (e.g., a resourceMapping.startPosition parameter), a resource mapping number of symbols parameter (e.g., a resourceMapping.nrofSymbols parameter), and a resource mapping repetition factor parameter (e.g., a resourceMapping.repetitionFactor parameter), among other examples. The inter-slot time domain pattern related parameter(s) may include, for example, a periodicity and offset parameter (e.g., a periodicityAndOffset-sp/p parameter), among other examples.

The resourceMapping.startPosition parameter may be used to indicate a first SRS symbol of the corresponding SRS resource that can be located on any OFDM symbol (e.g., for 3GPP Release 16 and above). The resourceMapping.nrfSymbols parameter may indicate a number of 1, 2 or 4 symbols that can be occupied by the corresponding SRS resource. All of the configured symbols can be allocated only on consecutive OFDM symbol indexes. The resourceMapping.repetitionFactor parameter may indicate a number of 1, 2 or 4 intra slot repetitions on the consecutive OFDM symbols defined by the two previous parameters that can be configured for the corresponding SRS resource. SRS symbol repetitions are transmitted using the same antenna port(s)/beam and on the same resource elements (REs). The periodicityAndOffset-sp/p parameter defines periodic/semi-periodic (P/SP) SRS periodicity and specific slots where P/SP SRS transmission will be done (e.g., via slot offset configuration complementary to periodicity). 3GPP Release 16 may allow for the configuration of up to 21 periodicity options (e.g., from 1 slot to 81920 slots periodicity) and allows a very good granularity for dynamic periodicity adaptation.

As indicated above, FIG. 5 is provided as an example. Other examples may differ from what is described with regard to FIG. 5.

As described above, an SRS may be used for uplink channel estimation, which in turn may be used for scheduling, link adaptation, precoder selection, or beam management, among other examples, by a network node. In some wireless communication systems, such as a 5G NR wireless communication system, a UE may include an increased quantity of antennas or antenna ports (e.g., as compared to deployments of UEs associated with earlier wireless communication systems) to enable spatial precoding/beamforming, and/or an increased uplink and/or downlink data capacity, among other examples. As a result, an increased quantity of resources (e.g., time domain resources and/or frequency domain resources) may be needed for SRS transmissions because the UE may need to transmit multiple SRSs to sound channels associated with each antenna, each antenna element, and/or each antenna panel associated with the UE.

Additionally, advancements in wireless communication technology have enabled a cell capacity (e.g., a quantity of UEs that can be supported in a single cell) to be increased and for cell coverage (e.g., a geographic area associated with a single cell) to be increased. As a result, an overhead associated with uplink channel estimations and/or SRS signaling has increased. For example, massive MIMO scenarios may be associated with an increased overhead associated with uplink channel estimations (e.g., by a network node via SRS uplink transmissions). For example, a network node may be required to perform simultaneous uplink channel estimations for multiple UEs (e.g., included in a group associated with co-scheduling). Further, enhanced support for mobility of UEs (e.g., with limited degradation in service quality for the mobile UEs) may require in increased rate of channel estimations or updates performed by the network node.

As a result, a signaling overhead associated with SRS transmissions (e.g., a quantity of time domain and/or frequency domain resources used for SRS transmissions) may be increased in such wireless communication systems to accommodate increased quantities of UE antennas or antenna ports, increased cell capacity, increased cell coverage, and/or enhanced UE mobility support, among other examples. Therefore, the network (e.g., a network node) may need to allocate more resources (e.g., time domain resources and/or frequency domain resources) for SRS transmissions that would have otherwise been used for other uplink transmissions or downlink transmissions. This may decrease a throughput (or link capacity) associated with communications between the network (e.g., a network node) and a UE or equivalently the overall cell capacity can be limited because of the increased SRS overhead in the cell. Thus, a smart trade off should be managed by the network (e.g., by a network node) for overall cell capacity optimizations.

Different mobile UE terminals have different speed, SNR, channel characteristics, location (e.g., located at cell edge or not located at a cell edge) at different time moments. Channel estimation and tracking (e.g., channel refresh) requirements depend on UE speed, UE SNR and number of layers for UE transmission. Correspondingly, a different time domain and/or frequency domain SRS patterns would be ideally required for different UE speeds, SNRs and channel types such that the overall link quality of a UE would not be limited by channel estimation and tracking accuracy from one side, and an unnecessary SRS allocations that consume uplink resources would be avoided from the other side. Thus, SRS resources allocations (e.g., bandwidth, density in frequency domain, allocation rate in time domain/periodicity) for required uplink channel estimations may be based on a UE speed, SNR, channel characteristics, and/or UE geographic location (e.g., whether the UE is near a cell edge), among other examples. Correspondingly, the required SRS allocations and/or SRS signaling overhead associated with uplink channel estimations may be determined dynamically and may change for a given UE over time. Therefore, an amount of SRS resources needed for a given UE (e.g., to be used by the UE to transmit SRSs that are measured by a network node for uplink channel estimations) may change over time. Furthermore, a quantity of UEs within a cell (e.g., communicating with a network node) may change over time. Therefore, different SRS configurations for the network (e.g., corresponding to a different SRS overhead level or threshold) may be acceptable at different times (e.g., in scenarios where fewer UEs are connected to a network node, the network node may configure the connected UEs to use a higher SRS transmissions volume and/or overhead or a larger bandwidth or a higher rate for transmitting SRSs).

Given the above considerations, in order to be able to get to an optimal tradeoff between SRS overhead and possible capacity increase and/or link quality per UE in a cell (e.g., due to an increased volume of SRS transmissions), it will be beneficial to use a dynamic SRS pattern per UE adaptive to UE speed, SNR, channel conditions, scheduling scenario and network loading. As a result, SRS configurations may be determined dynamically by the network for different UEs over time. However, in some cases, reconfiguration of one or more SRS resource sets for a UE may be a burdensome and lengthy procedure. For example, to change the configuration of the SRS resource set, the network node may use RRC reconfiguration procedures. Dynamic RRC based SRS reconfiguration (e.g., that is associated with a high latency and is not a synchronized procedure between UE and network) may not be a suitable option for dynamic reconfiguration "on the fly."

For aperiodic SRS resource sets, while the aperiodic SRS resource set may be dynamically triggered by the network node (e.g., in a DCI communication), the network node may use an RRC reconfiguration between the triggering events to change some SRS parameters including time domain and/or frequency domain resources or patterns associated with the aperiodic SRS resource set, however this introduces scheduling limitations for aperiodic SRS during a time period that may be involved in RRC reconfiguration procedures (e.g., in some cases can be several hundreds of milliseconds). As described above, RRC reconfiguration procedures are associated with high latency and are not synchronous (e.g., there may be ambiguity as to a time at which the UE and network node are to switch to using new configuration indicated by the RRC reconfiguration). Therefore, dynamic RRC reconfiguration of SRS resource sets may not be practical. As a result, the UE and network node may communicate using an SRS resource set that is associated with a static configuration that is not optimized for current cell conditions or cell load, scheduling scenario, channel conditions, and/or UE conditions, among other examples. This may result in the UE unnecessarily consuming resources (e.g., time domain resources and/or frequency domain resources) associated with transmitting SRSs using a static configuration (including the frequency domain pattern configuration) associated with the SRS resources and/or SRS resource set.

Some techniques and apparatuses described herein enable dynamic adaptation and/or reconfiguration of SRS time domain parameters (e.g., configuration parameters associated with indicating a time domain pattern for an SRS resource and/or an SRS resource set). In some aspects, a network node may configure, for a UE, an SRS resource set (e.g., and corresponding SRS resources) associated with one or more time domain parameters. For example, the network node may transmit, and the UE may receive, an SRS configuration, associated with an SRS resources and/or SRS resource set, indicating information (e.g., values, index values, and/or other information) for a set of one or more time domain parameters associated with the SRS resource set (e.g., and the corresponding SRS resources). The network node may transmit, and the UE may receive, a message indicating modified information (modified configuration, modified time domain parameters, and/or a dynamic reconfiguration) for a subset of (e.g., one or more) time domain parameters, from the set of one or more time domain parameters, associated with at least one SRS resource associated with the SRS resource set (e.g., the dynamic reconfiguration of the time domain parameters may be an a per-SRS resource basis or a per-SRS resource set basis). In other words, the network node may transmit a message that dynamically modifies configuration for one or more time domain parameters (e.g., RRC parameters) for the SRS resource set (e.g., and all related SRS resources) and/or for individual SRS resources associated with the SRS resource set. The message may be a MAC-CE indication or a DCI communication, among other examples. The SRS resource set may be an aperiodic SRS resource set, a periodic SRS resource set, or a semi-persistent SRS resource set.

As a result, the network node may be enabled to dynamically adapt or change one or more time domain parameters for an SRS resource set over time. For example, the network node may be enabled to dynamically adapt a time domain pattern or density associated with a given SRS resource set (SRS resources). Therefore, the network node and the UE may conserve resources (e.g., time domain resources) that would have otherwise been associated with communicating SRSs using SRS resources that do not have an optimized time domain configuration for current cell conditions or cell load, scheduling scenario, UE channel conditions, and/or UE conditions, among other examples.

The techniques described herein may enable the network node and the UE to reduce SRS overhead (e.g., SRS periodicity) as a function of the UE's mobility and/or Doppler spread, SNR, and multiple-user MIMO (MU-MIMO)/single-user MIMO (SU-MIMO) scheduling. The techniques described herein may enable the network node and the UE to improve SRS coverage (e.g., for cell edge UEs or UEs with very low SNR) with a dynamic signaling of a number of SRS repetitions. The techniques described herein may enable the network node and the UE to support reliable and accurate SRS based Doppler characteristics estimation in the uplink with minimal extra SRS overhead. The uplink and downlink efficiency improvements may be enabled by the ability to track accurate Doppler characteristics in the uplink (e.g., from Doppler knowledge on the network side). The techniques described herein may enable the network node and the UE to improve SRS allocation and scheduling flexibility based on reconfigurable SRS symbol indexes and slot offsets for P/SP SRS. The techniques described herein may enable the network node and the UE to improve scheduling flexibility for MU-MIMO based on dynamic reorganization of co-scheduling groups with the corresponding SRS reconfigurations.

Moreover, the dynamic time domain parameter adaptation techniques described herein may provide new configuration options that are targeted for codebook based, non-codebook based, and/or antenna switching SRS types to allow combining of channel sounding and CSI estimation procedures with a complementary Doppler characteristics estimation based on the same resources. According to the proposed approach, configuration for SRS resources may preserve all of the existing configurability of SRS while adding new configuration combinations of number of SRS symbols in a slot (Ns) on arbitrary symbol indexes and number of repetitions (R) over these SRS symbols/subset(s) of the SRS symbols. In this way, new time domain intra slot SRS patterns with arbitrary time gaps between two consecutive SRS symbols that are required for reliable Doppler characteristics estimation can be supported (can be enabled by a more flexible SRS configuration options). New combinations of number of SRS symbols and number of repetitions (via the ability to configure an arbitrary intra slot time domain pattern of SRS) enable excess SRS repetitions (and a corresponding increased overhead) to be avoided when combining channel sounding procedures with Doppler estimation ability based on the same resources.

Figure 6:
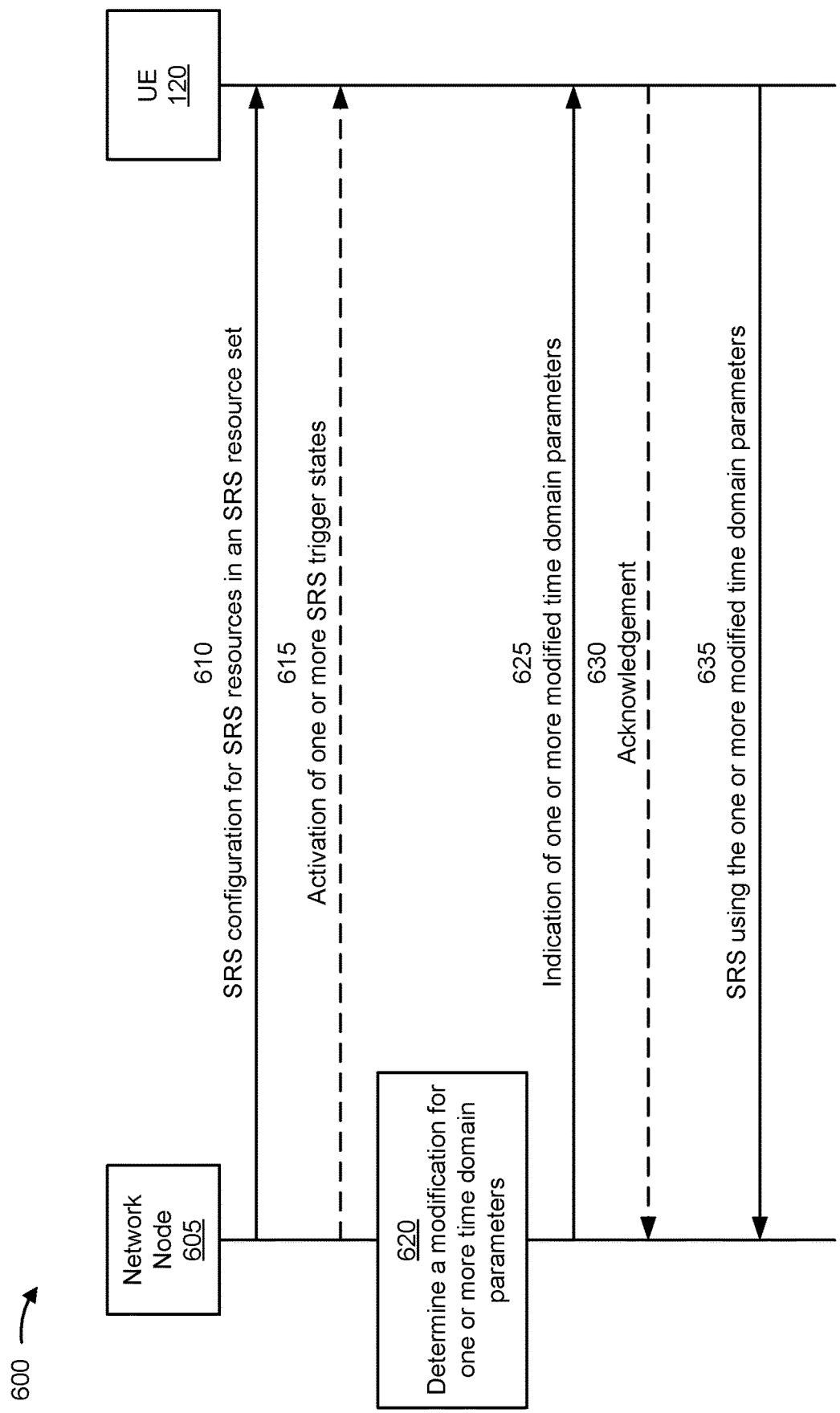
FIG. 6 is a diagram of an example associated with dynamic adaptation of SRS time domain parameters, in accordance with the present disclosure.

FIG. 6 is a diagram of an example 600 associated with dynamic adaptation of SRS time domain parameters, in accordance with the present disclosure. As shown in FIG. 6, a network node 605 (e.g., a base station 110, a CU 310, a DU 330, and/or an RU 340, among other examples) may communicate with a UE (e.g., the UE 120). In some aspects, the network node 605 and the UE 120 may be part of a wireless network (e.g., the wireless network 100). The UE 120 and the network node 605 may have established a wireless connection prior to operations shown in FIG. 6.

As shown by reference number 610, the network node 605 may transmit, and the UE 120 may receive, configuration information. In some aspects, the UE 120 may receive the configuration information via one or more of RRC signaling, one or more MAC-CEs, and/or DCI, among other examples. In some aspects, the configuration information may include an indication (e.g., an implicit indication) of one or more configuration parameters (e.g., stored by the UE 120 and/or previously indicated by the network node 605 or other network device or a list of configuration options predefined by the specification or by some other way) for selection by the UE 120, and/or explicit configuration information for the UE 120 to use to configure the UE 120, among other examples. For example, a DU or a CU may determine the configuration information and an RU may transmit the configuration information to the UE 120. The DU or the CU may transmit the configuration information to the RU.

In some aspects, the configuration information may include an SRS configuration. The SRS configuration may configure one or more SRS resources included in one or more SRS resource sets (e.g., in a similar manner as described in more detail elsewhere herein). For example, the SRS configuration may configure an SRS resource set and/or one or more SRS resources associated with the SRS resource set. The SRS configuration may indicate (e.g., in an SRS-ResourceSet. Usage information element) a usage type associated with the SRS resources (e.g., the SRS resource set may be associated with a use case of antenna switching, codebook, non-codebook, or beam management, among other examples). Additionally, or alternatively, the SRS configuration may indicate that the SRS resource set is a periodic SRS resource set, a semi-persistent SRS resource set, or an aperiodic SRS resource set. The SRS configuration may be an RRC configuration. For example, the network node 605 may transmit, and the UE 120 may receive, an indication of the SRS configuration via an RRC communication. In some aspects, the configuration information may partially be indicated by another message. For example, for an aperiodic SRS resource set (and aperiodic SRS resources included in the SRS resource set), the network node 605 may transmit DCI triggering the aperiodic SRS resource set, where the DCI at least partially indicates the configuration information. Similarly, the configuration information may be partially indicated by a MAC-CE indication (e.g., for semi-persistent SRS resources).

In some aspects, the configuration information may indicate one or more SRS resource identifiers. For example, the configuration information may indicate one or more SRS resource identifiers in an SRS-ResourceIDList information element. In some aspects, the configuration information may indicate multiple SRS resource identifiers (e.g., for each SRS resource associated with the SRS resource set). In some other aspects, the configuration information may indicate a single SRS resource identifier that is associated with multiple SRS symbols and ports.

The SRS configuration may indicate a time domain configuration and/or a frequency domain configuration associated with the SRS resource set (e.g., and related SRS resources). For example, the SRS configuration may indicate information (e.g., configuration information, values, indices, and/or code points, among other examples) for a set of one or more time domain parameters associated with the SRS resource and/or SRS resource set. The information for the set of one or more time domain parameters may indicate a time domain configuration and/or a time domain pattern associated with the SRS resources. For example, the information for the set of one or more time domain parameters may indicate time domain resources (e.g., slots, number of OFDM symbols for SRS and these symbols indexes in a slot, repetition across two or more SRS symbols and/or another type of time domain resources and parameters) to be associated with the one or more SRS resources and SRS transmissions.

For example, the set of one or more time domain parameters may include a resource mapping start position parameter (e.g., a resourceMapping.startPosition parameter), a resource mapping number of symbols parameter (e.g., a resourceMapping.nrofSymbols parameter), a resource mapping repetition factor parameter (e.g., a resourceMapping.repetitionFactor parameter), and/or a periodicity and offset parameter (e.g., a periodicityAndOffset-sp/p parameter), among other examples. In this way, the network node 605 may configure time domain information associated with the SRS resource set (e.g., and SRS resources associated with the SRS resource set).

Alternatively, other time domain parameters (e.g., other than those described above) may be used to allow new intra-slot time domain SRS patterns required to support Doppler characteristics estimation complimentary to channel sounding/CSI evaluation procedures and based on the same SRS resource(s). These alternative time domain parameters may provide more flexible SRS configuration options for codebook based SRS, non-codebook based SRS, antenna switching SRS, beam management SRS, and/or another SRS usage type to allow combining of channel sounding and CSI estimation procedures with a complementary Doppler characteristics estimation based on the same resources. These alternative time domain parameters may permit all of the existing configurability of SRS while providing new combinations of number of SRS symbols in a slot (Ns) on arbitrary symbol indexes and number of repetitions (R) over these SRS symbols/subset(s) of the SRS symbols. This allows for new combinations to avoid excess SRS repetitions (and increased overhead correspondingly) when combining channel sounding procedures with Doppler estimation ability based on the same resources. These alternative time domain parameters may be applicable for any SRS resource having any time behavior type (e.g., periodic, semi-periodic, aperiodic) and listed under SRSResourceSet with any existing usage option. For beam management SRS, the alternative time domain parameters may be used to configure the same time domain patterns as can be configured with the time domain parameters described above, but provide, in general, a greater flexibility for future extensions (e.g., more consecutive repetitions, split in time consecutive repetitions).

The alternative time domain parameters may be indicated in a bitmap configuration that can be used to indicate intra-slot SRS symbol locations per SRS resource identifier. The bitmap parameter may have a size of 14 bits or another bit size. Each bit may refer to one of the OFDM symbols of a slot. Non-zero values or elements of the bitmap (e.g., a bit value=1) may be used to indicate where SRS symbols are allocated. The number of non-zero elements in the bitmap may implicitly indicate the number of SRS symbols for the addressed SRS resource correspondingly. Alternatively, zero values may be used to indicate where SRS symbols are allocated.

The time domain parameters such as the first SRS symbol position per slot (startPosition) and the number of SRS symbols per slot (nrofSymbols) are not used in implementations in which the bitmap configuration is used. Any start position and any Ns can be configured using the bitmap (thus, the bitmap is fully generic). A valid number of SRS symbols per slot can be selected from the following extended list of options: Ns=1, 2, 3, 4, where the Ns=3 option is included in addition to the available options provided by the nroISymbols parameter. In other words, the bitmap is capable of indicating an Ns that is not otherwise capable of being indicated by the nroISymbols parameter. The RRC parameter for number of repetitions (repetitionFactor) may still be used, but additional repetition factor options can be added, such as R=3. However, the bitmap may be used to indicate a time gap between repetitions of an SRS. In particular, the bit distance between two non-zero value bits in the bitmap may correspond to the time gap between two repetitions of an SRS in the SRS resource set. The bitmap may be used to indicate multiple (different) time gaps for multiple SRS repetitions in a flexible way.

The addition of Ns=3 and R=3 configuration options provides several special combinations such as [Ns=3,R=2] and [Ns=4,R=3], which may provide flexible selection of time domain parameters for enabling Doppler parameters estimation with minimum overhead (e.g., no excess repetition like in a case of Ns=4, R=2 for example) while still preserving intra slot frequency hopping functionality for these cases.

The network node 605 may determine the SRS configuration. For example, a base station, CU, and/or DU may determine the SRS configuration. In some aspects, the network node 605 may determine the SRS configuration based at least on a carrier frequency, a subcarrier spacing, a type of deployment, cell loading, scheduling scenario, a UE channel condition (e.g., SNR, delay spread, and/or a Doppler parameter), a UE channel type, a geographic location of the UE 120, and/or movement information associated with the UE 120 (e.g., a speed of the UE 120, an acceleration of the UE 120, and/or a direction of travel of the UE 120), among other examples. In some aspects, the network node 605 may adaptively determine the SRS configuration to optimize time domain resources used by the UE 120 to transmit SRSs based at least on information (e.g., described above) at a time when, or slightly before, the SRS configuration is transmitted to the UE 120.

The UE 120 may configure the UE 120 based at least on the configuration information. In some aspects, the UE 120 may be configured to perform one or more operations described herein based at least on the configuration information.

In some aspects, the UE 120 may transmit, and the network node 605 may receive, a capabilities report. For example, the UE 120 may transmit, to an RU, the capabilities report. The RU may transmit, to a DU, an indication of the capabilities report. In some aspects, the capabilities report may indicate UE support for dynamically adopting configuration parameters for SRS, as described in more detail elsewhere herein. For example, the capabilities report may indicate that the UE 120 is capable of dynamically adapting information or a configuration of one or more time domain parameters associated with SRS resources, as described in more detail elsewhere herein. In some aspects, the network node 605 may dynamically adapt one or more time domain parameters, as described in more detail elsewhere herein, based at least on the capabilities report indicating that the UE 120 supports dynamic adaptation of time domain parameters associated with SRS resource sets.

In some aspects (e.g., for aperiodic SRS adaptation), as shown by reference number 615, the network node 605 may transmit, and the UE 120 may receive, a message activating one or more SRS trigger states. For example, the configuration information (e.g., an RRC configuration) may configure a set of SRS trigger states. For example, the UE 120 may receive, from the network node 605, an RRC configuration of multiple SRS trigger states associated with a given SRS resource set (e.g., a given aperiodic SRS resource set). The multiple SRS trigger states may be associated with different respective configurations for the set of one or more time domain parameters for the SRS resources linked to the SRS resource set. The UE 120 may receive, from the network node 605, a MAC-CE indication (e.g., synchronous and low latency signaling) activating one or more SRS trigger states. The MAC-CE indication may indicate an association of (e.g., a mapping of) the one or more SRS trigger states to code points (e.g., index values) of an SRS request field of a DCI communication. In this way, by configuring and dynamically activating or deactivating multiple SRS trigger states associated with the same SRS resource set (e.g., for an aperiodic SRS resource set) but with a different configuration for the SRS resource set, the network node 605 may be enabled to dynamically adapt time domain configurations to be used by the UE 120 associated with different triggering events for the aperiodic SRS resource set transmissions, as explained in more detail elsewhere herein.

As shown by reference number 620, the network node 605 may determine a modification for one or more time domain parameters associated with the SRS (e.g., for one or more (or all) SRS resources associated with the SRS resource set). For example, the network node 605 may determine modified information for one or more (or all) time domain parameters, from the set of one or more time domain parameters, associated with the SRS resource set. In other words, the network node 605 may determine one or more modified time domain parameters that have different values from the time domain parameters indicated at 610. Alternatively, the modified information may include a modified SRS configuration, or an SRS reconfiguration, that includes one or more different time domain parameters from the time domain parameters indicated at 610.

In some aspects, the network node 605 may determine a modified time domain pattern to be associated with the SRS resource set (e.g., and related SRS resources), a modified repetition factor to be associated with the SRS resource set, modified SRS symbol locations to be associated with the SRS resource set, a modified number of SRS symbols per SRS resource to be associated with the SRS resource set, and/or other modified time domain parameters to be associated with the SRS resource set.

In some aspects, the network node 605 may determine the modification and/or the modified information based at least on some characteristics or information that has changed since a time at which the configuration information (e.g., the SRS configuration) was transmitted to the UE 120. For example, the network node 605 may determine the modification and/or the modified information based at least on a current SNR of a channel between the UE 120 and the network node 605, a channel type or channel delay spread characteristics or channel frequency response characteristics, a speed of the UE 120, a geographic location of the UE 120 (e.g., near a cell edge), a data volume associated with the UE 120 (e.g., an amount, or size, of data communicated between the UE 120 and the network node 605), a quantity of UEs being served by the network node 605, a co-scheduling determination (e.g., associated with uplink massive MIMO scenarios), current NW load characteristic and/or a scheduling regime/scenario for a UE, among other examples.

As shown by reference number 625, the network node 605 (e.g., a base station 110 or an RU) may transmit, and the UE 120 may receive, a dynamic indication of the one or more modified time domain parameters for the SRS resources of the SRS resource set. For example, rather than reconfiguring the SRS resources associated with the SRS set via an RRC reconfiguration procedure (e.g., non-synchronous and with a high latency), the network node 605 may dynamically adapt information for the one or more (or all) time domain parameters associated with the SRS resource set (e.g., via dynamically reconfiguring the SRS resources), as described in more detail elsewhere herein.

The one or more modified time domain parameters (e.g., that are dynamically adapted or modified for a periodic SRS resource set, a semi-persistent SRS resource set, or an aperiodic SRS resource set) may include a modified resource mapping start position parameter (e.g., a modified resourceMapping.startPosition parameter), a modified resource mapping number of symbols parameter (e.g., a modified resourceMapping.nrofSymbols parameter), a modified resource mapping repetition factor parameter (e.g., a modified resourceMapping.repetitionFactor parameter), and/or a modified periodicity and offset parameter (e.g., a modified periodicityAndOffset-sp/p parameter), among other examples.

Alternatively, the one or more modified time domain parameters may be indicated in a bitmap in the dynamic indication. The bitmap may be used to indicate a modified number of SRS symbols in a slot (e.g., a modified Ns) and a modified locations for these symbols with arbitrary time gaps between different SRS symbols. instead of what can be configured with the existing time domain parameters described above. Moreover, a bitmap can be used to indicate parameters of the SRS configuration itself.

In some aspects, the dynamic indication (e.g., that indicates the one or more modified time domain parameters) may be included in a MAC-CE indication. For example, the network node 605 may use MAC-CE-based reconfiguration of time domain parameters for an SRS resource set and/or for SRS resources included in an SRS resource set (e.g., for a periodic SRS resource set, a semi-persistent SRS resource set, or an aperiodic SRS resource set). The information indicated by the MAC-CE indication may be applicable to all SRS resources associated with the SRS resource set (e.g., the reconfiguration may be done per SRS resource set identifier and may be applicable for all SRS resources listed under the indicated SRS resource set identifier). In some aspects, the information indicated by the MAC-CE indication may be applied by the UE 120 and/or the network node 605 a quantity of slots (e.g., N slots) after a transmission by the UE of the corresponding acknowledgement (ACK) message associated with the MAC-CE indication. For example, as shown by reference number 630, the UE 120 may transmit an ACK message associated with a message indicating that a communication (e.g., a PDSCH) associated with the MAC-CE indication was successfully decoded by the UE 120. The UE 120 and/or the network node 605 may apply the modified information for the one or more time domain parameters for the SRS resource set the quantity (e.g., N) of slots after a slot in which the ACK message is transmitted. In some aspects, the information indicated by the MAC-CE indication may be applicable to one or more activated semi persistent SRS resource sets (or SRS resources) and one or more not activated semi persistent SRS resource sets (or SRS resources).

In some aspects, the MAC-CE indication indicates the one or more modified time domain parameters. In other words, the MAC-CE indication may explicitly indicate the one or more modified time domain parameters for the SRS resource set. In some other aspects, the MAC-CE indication may implicitly indicate the one or more modified time domain parameters for the SRS resource set. For example, the UE 120 may receive (e.g., in an RRC configuration and/or via the configuration information) an indication of one or more sets of time domain parameters associated with the SRS resource set. In other words, the network node 605 may configure one or more options for sets of time domain parameters associated with the SRS resource set (e.g., several configuration options per SRS resource or SRS resource set identifier may be listed or pre-configured by an RRC configuration).

The MAC-CE indication may indicate or activate one set of time domain parameters associated with the SRS resource set (e.g., from the RRC configured sets or options). Subsequent MAC-CE indications may be used to modify the time domain parameters that are used by the UE 120 by activating another set of time domain parameters (e.g., that are modified from the previously activated time domain parameters). For example, the MAC-CE indication may activate a set of time domain parameters that includes one or more time domain parameters that are modified with respect to a currently (or previously) activated or semi-statically configured set of time domain parameters for the SRS resource set.

In some aspects, one of the SRS configuration options for each SRS resource or SRS resource set identifier may be dynamically activated, selected, or indicated by the MAC-CE indication. The indicated option may become the active or used SRS configuration for the relevant (indicated by the MAC-CE) SRS resource or SRS resource set until a next MAC-CE reactivation or indication. As described above, the UE 120 and/or the network node 605 may apply the information for the time domain parameter(s) indicated by the set of information activated by the MAC-CE message N slots after a slot in which the ACK message associated with the PDSCH allocation carrying the MAC-CE indication is transmitted by the UE 120 (e.g., as described in connection with reference number 630).

In some aspects, one or more sets of time domain parameters for the SRS resource set may be defined, or otherwise fixed, by a wireless communication standard, such as the 3GPP. For example, a default set of time domain parameters (default configuration) for the SRS resource set may be defined by a wireless communication standard or may be determined based on standard defined rule as a default configuration option applicable before any activating MAC-CE indication (e.g., to be used by the UE 120 prior to receiving a first MAC-CE indication that indicated which set of information, from the RRC configured options, is to be used by the UE 120). The MAC-CE indication may subsequently activate a different set of time domain parameters, which may include the one or more modified time domain parameters that are modified or different relative to the time domain parameters in the default set of time domain parameters.

For example, the network node 605 may indicate, for a given SRS resource set, a first configuration option, a second configuration option, and/or additional configuration options. The first configuration option may indicate a first bitmap that configures Ns=2 and with a time gap=5, repetition configuration of R=2, and with frequency hopping disabled. The second configuration option may indicate a second bitmap that configures Ns=3 and with time gaps of 1 and 5, repetition configuration of R=3, and with frequency hopping is disabled. The network node 605 may activate (e.g., via the MAC-CE indication) different configuration options for the given SRS resource set under different circumstances. For example, the network node 605 may activate the first configuration option in case of a limited Doppler spread and UE mobility scenarios or LOS type of channel to allow a reliable and accurate Doppler shift estimation. The network node 605 may activate the second configuration option in high UE mobility scenarios and high delay spread channels resulting in a high Doppler spread to allow a decoupled and reliable estimation of equivalent Doppler shift and channel Doppler spread/time correlation characteristics. In this way, a size of the MAC-CE indication may be reduced (e.g., because the network node 605 may only need to indicate a configured option, rather than all of the information for the time domain parameter(s)), while still enabling the network node 605 to dynamically adapt the time domain parameter(s) for an SRS resource set.

In some other aspects, the dynamic indication of the one or more modified time domain may be included in a DCI communication. In some aspects, the dynamic indication is included in a DCI communication that is not associated with data transmission scheduling (e.g., a DCI communication that does not schedule a data transmission). A DCI communication that is not associated with data transmission scheduling may also be referred to as a "dummy DCI." In some aspects, the DCI communication may be associated with a DCI format 1_1 or a DCI format 1_2 (e.g., as defined, or otherwise fixed, by the 3GPP). For example, a non-data scheduling DCI (e.g., using DCI format 1_1 or DCI format 1_2) may be used to indicate the one or more modified time domain parameters for the SRS resource set. In some other aspects, the non-data scheduling DCI communication may be associated with a dedicated DCI format that is associated with modifying SRS configuration parameters. For example, a DCI format may be defined (e.g., by a wireless communication standard, such as the 3GPP) that is associated with dynamic SRS parameter adaptation.

In some aspects, the non-data scheduling DCI communication may indicate the one or more modified time domain parameters (e.g., in an explicit manner where the DCI communication includes the modified information). In some other aspects, the DCI communication may indicate the one or more modified time domain parameters implicitly. For example, a table with SRS configuration parameters may be indicated by the network node 605 (e.g., in an RRC configuration) and/or may be defined by a wireless communication standard, such as the 3GPP. The DCI communication may indicate an identifier (e.g., a row index and/or a column index) of the table to indicate the one or more modified time domain parameters. The UE 120 may also identify the modified information for the one or more frequency domain parameters based at least on the identifier and the information indicated by the table.

The one or more modified time domain parameters, indicated by the DCI communication, may be associated with all SRS resources associated with the SRS resource set (e.g., may refer to a specific SRS resource set identifier). The UE 120 may confirm receipt of the modified information (e.g., the reconfiguration) associated with the SRS resource set via an ACK message associated with the non-data scheduling DCI communication. For example, as shown by reference number 630, the UE 120 may transmit the corresponding ACK message indicating that the DCI communication was successfully decoded by the UE 120 (e.g., instead of indicating that the corresponding scheduled PDSCH allocation was successfully decoded by the UE, as may otherwise be the case). The UE 120 and/or the network node 605 may apply the one or more modified time domain parameters for the SRS resource set a quantity of slots (e.g., M slots) after the slot in which the ACK message is transmitted by the UE 120. The one or more modified time domain parameters may override a current RRC configuration of the one or more time domain parameters. The one or more modified time domain parameters indicated by the non-data scheduling DCI communication may be associated with one or more active semi persistent SRS resource sets and/or one or more not active (e.g., not activated) SP SRS resources and/or SRS resource sets.

In some aspects, for dynamic adaptation of time domain parameter(s) for an aperiodic SRS resource set, the message may be included in a DCI communication that schedules a transmission of the aperiodic SRS resource set. For example, dynamic adaptation of time domain parameters for an aperiodic SRS resource set may be coupled with aperiodic SRS resource set triggering procedures (e.g., can be done per aperiodic SRS scheduling event). For example, the DCI communication may schedule a transmission of the aperiodic SRS resource set via indicating an SRS trigger state, in an SRS request field of the DCI, that is associated with or mapped to the aperiodic SRS resource set. In some aspects, the DCI communication does not schedule any UL data communications (e.g., the DCI communication may be a dummy DCI). For example, the DCI communication may be associated with a non-PUSCH scheduling format (e.g., a dummy DCI of format 0_1 or format 0_2 as defined by the 3GPP).

For example, the DCI communication may schedule the aperiodic SRS resource set (e.g., may schedule one or more aperiodic SRS resource sets) via an SRS trigger state indicated by an SRS request field. Additionally, the DCI communication may indicate the one or more modified time domain parameters for the aperiodic SRS resource set via one or more other fields of the DCI communication. For example, one or more fields of the non-PUSCH scheduling format may be used to indicate (e.g., explicitly or implicitly) dynamic information for one or more time domain parameters. For example, a table with SRS configuration parameters may be indicated by the network node 605 (e.g., in an RRC configuration) and/or may be defined by a wireless communication standard, such as the 3GPP. The DCI communication may indicate an identifier (e.g., a row index and/or a column index) of the table (e.g., in the one or more other fields of the DCI communication) to implicitly indicate the one or more modified time domain parameters. For example, the DCI communication may indicate one or more indices associated with a data structure that includes multiple SRS configuration options and the one or more indices may correspond to the one or more modified time domain parameters. The UE 120 may identify the one or more modified time domain parameters based at least on the identifier and the information indicated by the table. Alternatively, the one or more other fields may indicate explicit information for the one or more modified time domain parameters.

The information indicated by the non-PUSCH scheduling DCI communication that schedules the transmission of the aperiodic SRS resource set may apply to all SRS resources associated with the aperiodic SRS resource set. In some aspects, the SRS trigger state (e.g., indicated by the SRS request field of the DCI communication) schedules multiple aperiodic SRS resource sets including the aperiodic SRS resource set. In some aspects, the DCI communication indicates respective sets of time domain parameters for each of the multiple triggered aperiodic SRS resource sets. For example, information for time domain parameters may be indicated separately for each one of the triggered or scheduled SRS resource set identifiers. Alternatively, the one or more modified time domain parameters may be associated with each of the multiple aperiodic SRS resource sets. For example, information for time domain parameters may be indicated collectively for all of the triggered or scheduled aperiodic SRS resource set identifiers. For example, a single set of information for the time domain parameters may be applicable to all of the triggered or scheduled aperiodic SRS resource set identifiers.

In some other aspects, the DCI communication that schedules the aperiodic SRS resource set may schedule one or more data communications. For example, the DCI communication may be a PUSCH or a PDSCH scheduling DCI communication (e.g., using DCI format 0_1, DCI format 0_2, DCI format 1_1, or DCI format 1_2, among other examples). As described above in connection with reference number 615, the UE 120 may receive an RRC configuration of multiple SRS trigger states associated with the SRS resource set, where the multiple SRS trigger states are associated with different respective configurations for the time domain parameter(s) for the SRS resource set. In other words, multiple SRS trigger states may be configured for the same aperiodic SRS resource set, where each of the multiple SRS trigger states are associated with different time domain configurations for the same aperiodic SRS resource set. Because the DCI communication may schedule one or more data communications, additional fields may not be available in the DCI to indicate the information for the one or more time domain parameters (e.g., in contrast to the case of the non-data scheduling DCI communication). Therefore, the network node 605 may configure several time domain configuration options for the same SRS resource set via the SRS trigger states to provide additional flexibility to dynamically adapt or modify the time domain allocation, density, and/or pattern associated with the SRS resource set. The DCI communication may indicate a triggered SRS trigger state, from the multiple SRS trigger states, that is associated with the information or modified configuration (e.g., determined by the network node 605 as described in connection with reference number 620) for the time domain parameter(s) of the aperiodic SRS resource set. For example, an SRS configuration option that is indicated via a scheduled SRS trigger state may override an RRC configuration (e.g., the SRS configuration) for the triggered SRS resources or SRS resource set (e.g., may dynamically reconfigure the aperiodic SRS per scheduling event).

For example, a first code point (e.g., 01) may be mapped to the SRS resource set and a first configuration option, a second code point (e.g., 10) may be mapped to the SRS resource set and a second configuration option, and a third code point (e.g., 11) may be mapped to the SRS resource set and a third configuration option. The network node 605 may indicate a different codepoint in the SRS request field of the DCI communication to dynamically adapt a time domain configuration of the given aperiodic SRS resource set per scheduling event.

As described above in connection with reference number 615, in some cases, the network node 605 may activate one or more SRS trigger states (e.g., to reduce a quantity of activated trigger states and the required SRS request fields size in the DCI correspondingly) from a larger quantity of RRC configured SRS trigger states. The DCI communication may indicate an SRS trigger state, from the list of activated SRS trigger states. For example, activating a subset of configured SRS trigger states may enable a smaller size of the SRS request field or may enable the currently used SRS request field size to be maintained while also enabling additional SRS trigger states to be configured and dynamically activated or deactivated to allow a dynamic SRS configuration adaptation by the network node 605.

Alternatively, a field of an extended or modified format data scheduling DCI communication may indicate an index associated with a time domain configuration and/or one or more time domain parameters associated with the aperiodic SRS resource set. For example, the field may explicitly indicate the index of the time domain configuration and/or one or more time domain parameters associated with the aperiodic SRS resource set for a triggered or scheduled aperiodic SRS resource set. The field may be a bitfield. In some aspects, the field may have a size of $\log_2(K)$, where K is the quantity (e.g., a maximum quantity) of SRS configurations to be dynamically signaled for SRS resources/SRS resource sets.

In some aspects, as shown by reference number 630, the UE 120 may transmit, and the network node 605 may receive, an ACK message associated with the message that indicates the modified and/or reconfigured time domain resource parameter(s) for the SRS resource set. For example, the ACK message may be associated with a PDSCH allocation (e.g., that carries a MAC-CE indication). As described above, the ACK message may be associated with a DCI communication. The ACK message may indicate whether the message that indicates the modified and/or reconfigured time domain resource parameter(s) for the SRS resource set was successfully received and/or decoded by the UE 120.

In some aspects, the UE 120 and/or the network node 605 may apply the modified and/or reconfigured time domain resource parameter(s) for the SRS resource set a quantity of slots (e.g., N slots or M slots) after the ACK message is transmitted by the UE 120. Alternatively, the UE 120 and/or the network node 605 may apply the modified and/or reconfigured time domain resource parameter(s) for the SRS resource set a quantity of slots after the message that indicates the modified and/or reconfigured time domain resource parameter(s) for the SRS resource set is transmitted by the network node 605. In some aspects, the network node 605 may also indicate one or more modified frequency or spatial (antenna ports, quasi collocation) domain parameters that may be used by the UE 120 for dynamic SRS parameter adaptation.

As shown by reference number 635, the UE 120 may transmit, and the network node 605 may receive, one or more SRSs using the modified or reconfigured information (reconfiguration) for the one or more time domain parameters. For example, the UE 120 may transmit an SRS, using one or more SRS resources included in the SRS resource set, in accordance with the modified information for the one or more time domain parameters.

As a result, the network node 605 may be enabled to dynamically adapt or change one or more time domain parameters for an SRS resource set over time. For example, the network node 605 may be enabled to dynamically adapt a time domain pattern with a given SRS resource set. Therefore, the network node 605 and the UE 120 may conserve resources (e.g., time domain resources) that would have otherwise been associated with communicating SRSs using an SRS resource that does not have an optimized time domain configuration for current cell conditions, UE channel conditions, and/or UE conditions, among other examples. Additionally, the network node 605 may dynamically adapt SRS capacity (e.g., by multiplexing more or less SRS resources in the time domain) to serve additional UEs in the cell while maintaining a fixed SRS overhead in the cell. As another example, RRC signaling overhead may be reduced because the SRS resources may not need an RRC reconfiguration to adapt or adjust the time domain parameters of the SRS resource set. Further, the network node 605 may improve SRS coverage (e.g., for mobile UEs, UEs near a cell edge, or UEs associated with low SNR conditions). The dynamic adaptation of time domain parameters for an SRS resource may be associated with additional benefits as described in more detail elsewhere herein.

In some aspects, the dynamic time domain parameter adaptation described herein for SRS may enable dynamic SRS periodicity adjustment as a function of the mobility/Doppler of the UE 120. In case of a higher UE mobility, a higher rate of channel estimation/CSI refresh will typically be required to keep a limited degradation in the service quality for UE 120 because of a fast channel time correlation decay and related CSI mismatches developed as a function of time. In a case that the channel allows a rank index (RI) greater than 1, the sensitivity for channel sounding/CSI updating rate under a higher mobility scenario will be increased (e.g., increased sensitivity for precoding matrix indicator (PMI) mismatch). For lower UE mobility/Doppler scenarios, a lower SRS periodicity will be sufficient, such that an SRS-based CSI refresh will not become a limiting factor for the link efficiency. When a constant (e.g., RRC configured) periodicity of periodic/semi-periodic SRS is used, the network is required to target some trade off in advance between SRS overhead (which is a function of periodicity) and performance degradation for UEs having mid/high SNR and mobility (e.g., significant CSI aging over a single SRS period time). In case that the configured SRS periodicity is not sufficient, a higher MCS backoff will need to be enforced by the UE 120 and network node 605 in the reported channel state feedback (CSF) or evaluated CSI for link adaptation (LA). In some cases, the UE 120 and network node 605 may also reduce the applicable/reported/determined RI (e.g., down to RI=1) to mitigate PMI mismatch related sensitivity. Adaptive periodicity for P/SP SRS resources as a function of Doppler/UE mobility and UE SNR will allow the UE 120 and network node 605 to maximize overall UE link efficiency and cell capacity to achieve an optimal tradeoff between SRS overhead and potential improvement in spectral efficiency of the UE link due to a lower SRS periodicity as a function of Doppler and SNR.

In some aspects, the dynamic time domain parameter adaptation described herein for SRS may enable dynamic SRS periodicity adjustment as a function of MU-MIMO/SU-MIMO for the UE 120. In the case of MU-MIMO, channel sounding rate/CSI refresh requirements will be even more sensitive to mobility of the co-scheduled UEs for MU-MIMO UEs. The impact of a joint precoding mismatch for co-scheduled UEs is typically more significant than in the case of SU-MIMO. For this reason, UEs having a mobility greater than a threshold are typically excluded from a MU-MIMO co-scheduling group. Transition of a UE from SU-MIMO to MU-MIMO (back and forth) as a function of UE mobility can be accompanied by SRS periodicity reconfiguration (SU-MIMO with a higher SRS periodicity and MU-MIMO with a lower SRS periodicity for the same Doppler/mobility scenario). This approach will allow improvement of SRS overhead in the cell.

In some aspects, the dynamic time domain parameter adaptation described herein for SRS may enable SRS coverage enhancement using dynamic SRS repetitions. For cell edge UEs and/or UEs having a very poor SNR conditions in the uplink, the accuracy of SRS based channel sounding/CSI evaluation can be improved or maintained at the required level using SRS repetitions. This approach can be efficient (without any excess SRS overhead) only if a dynamic reconfiguration of SRS repetition factor will be employed as a function of UE SNR in uplink.

In some aspects, the dynamic time domain parameter adaptation described herein for SRS may enable SRS based Doppler characteristics estimation based on adaptive time domain SRS patterns for the UE 120. Doppler characteristics knowledge per UE at the network node 605 is required for efficient link management and multiple related configuration and scheduling decisions at the network node 605 and for an enhanced uplink reception. These Doppler characteristics may include SRS/CSI-RS periodicity determination for the required rate of CSI updates, determination of the most convenient configuration of uplink and/or downlink DMRS (e.g., DMRS adaptation), MU-MIMO co-scheduling UEs and groups tracking, side information/assistance in uplink channel estimation, side information/assistance in downlink and/or uplink link adaptation, CSI prediction, and/or Doppler shift pre-compensation in downlink for multi-TRP, among other examples.

The flexible intra-slot time domain pattern options of the dynamic time domain parameter adaptation described herein may enable reliable and accurate Doppler characteristics estimation in the uplink (including SRS based estimation). The flexible intra-slot time domain pattern options for SRS described herein are required to resolve this issue. Doppler estimation robustness, accuracy, and the SRS overhead required to support it can be improved by dynamically adapting time domain patterns per UE speed, channel type and depending on the Doppler characteristic targeted for measurement (e.g., Doppler shift and/or Doppler spread). Rate of Doppler estimations may be lower than the rate of channel sounding/CSI updates or can be done from time to time. This allows for dynamically switching between two SRS patterns (with and/or without support for Doppler estimation) to avoid transmission of extra SRS repetitions required to support Doppler characteristics estimation for every SRS occurrence.

As indicated above, FIG. 6 is provided as an example. Other examples may differ from what is described with regard to FIG. 6.

FIGS. 7A-7F are diagrams of example intra-slot time domain SRS pattern configurations, in accordance with the present disclosure. The example intra-slot time domain SRS pattern configurations of FIGS. 7A-7F (and other intra-slot time domain SRS pattern configurations) may be dynamically indicated for dynamic adaptation of SRS time domain parameters, as described herein. A network node, such as the network node 605 (e.g., a base station 110, a CU 310, a DU 330, and/or an RU 340, among other examples) may dynamically indicate one or more of the example intra-slot time domain SRS pattern configurations of FIGS. 7A-7F (and other intra-slot time domain SRS pattern configurations) to a UE (e.g., the UE 120).

Figures 7A, 7B:
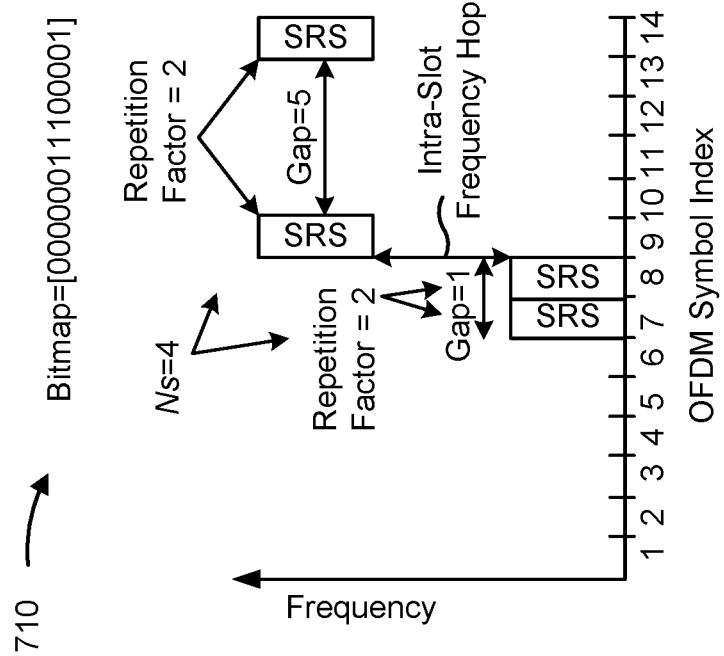

FIG. 7A illustrates an example intra-slot time domain SRS pattern configuration 705. This configuration can be done using the alternative bitmap based configuration approach that was addressed before where the bitmap for the example intra-slot time domain SRS pattern configuration 705 may be configured as 00100001100001. The bitmap indicates a plurality of intra-slot SRS symbol locations for each SRS resource in an SRS resource set. Each bit in the bitmap corresponds to a respective OFDM symbol index in a slot associated with the SRS resource set. Each OFDM symbol index corresponds to a position of a bit in the bitmap. For example, the first (left-most) bit in the bitmap corresponds to OFDM symbol index 1, the second bit in the bitmap corresponds to OFDM symbol index 2, and so on.

Non-zero values in the bitmap indicate that an SRS transmission is configured for the associated OFDM symbol index. In the example intra-slot time domain SRS pattern configuration 705, OFDM symbol indexes 3, 8, 9, and 14 are scheduled for an SRS transmission. Thus, the bitmap configures a number of SRS symbols in the slot as Ns=4.

As further shown in FIG. 7A, the example intra-slot time domain SRS pattern configuration 705 includes two pairs of SRS symbols assuming that repetition factor 2 is configured in this example for the corresponding SRS resource in addition to the bitmap configuration for SRS symbol locations. Each SRS symbols pair corresponds to two repetitions (repetition factor (R)=2). Moreover, the bitmap configures the time gap between SRS symbols and between the repetitions correspondingly. For example, in case of R=2 configuration coupled to the bitmap configuration, it will configure the time gap of 5 OFDM symbols between repetitions of SRS on the first pair of SRS symbols and on the second pair of SRS symbols (because of the positions in the bitmap of the SRS symbols). Moreover, intra-slot frequency hopping is configured in the example intra-slot time domain SRS pattern configuration 705, which enables each portion of repeated SRS symbols (2 repetitions in this case) to be transmitted in different frequency resources according to the frequency hopping pattern. In the example intra-slot time domain SRS pattern configuration 705, the same time gap is configured for two SRS pairs that can be used for Doppler correlation estimation.

FIG. 7B illustrates an example intra-slot time domain SRS pattern configuration 710. The bitmap for the example intra-slot time domain SRS pattern configuration 710 may be configured as 00000011100001. Thus, the example intra-slot time domain SRS pattern configuration 710 is similar to the example intra-slot time domain SRS pattern configuration 705, except that different time gaps are configured for two SRS pairs in the example intra-slot time domain SRS pattern configuration 710. The first SRS symbols pair is configured with a time gap=1 and the second SRS symbols pair is configured with a time gap=5. The first SRS symbols pair may be used/convenient for Doppler shift estimation, and the second SRS symbols pair may be used/convenient for Doppler correlation estimation. Accordingly, the bitmap described herein enables flexible time gap configurations for SRS symbols and SRS repetitions correspondingly in a slot (in case that R>1 is configured).

FIG. 7C illustrates an example intra-slot time domain SRS pattern configuration 715. The bitmap for the example intra-slot time domain SRS pattern configuration 715 may be configured as 00100001000000. In the example intra-slot time domain SRS pattern configuration 715, repetition factor 2 (R=2) configuration is assumed complementary to the bitmap configuration and, correspondingly, this SRS configuration example results in 2 repeated SRS symbols with time gap of 5 OFDM symbols. Thus, the provided example time domain SRS pattern in 7C corresponds to number of SRS symbols in the slot configured as Ns=2, complementary configuration of the repetition factor (R)=2 and intra-slot frequency hopping as not enabled. The bitmap enables configurations of up to 4 repetitions with different/flexible time gaps to support Doppler characteristics estimation in different scenarios (including with and/or without intra-slot frequency hopping). The single SRS symbols pair (2 repetitions across the 2 configured SRS symbols) in the example intra-slot time domain SRS pattern configuration 715 may be used/convenient for Doppler correlation estimation for example.

FIG. 7D illustrates an example intra-slot time domain SRS pattern configuration 720. The bitmap for the example intra-slot time domain SRS pattern configuration 720 may be configured as 00110001000000. In the example intra-slot time domain SRS pattern configuration 715 repetition factor (R)=3 is assumed to be complementary configured. Thus, the example time domain pattern of 7D corresponds to the combination of the following configured parameters (explicitly or implicitly configured): the mentioned above bitmap configuration configures a number of SRS symbols in the slot as Ns=3, the repetition factor (R)=3 configured complementary and intra-slot frequency hopping is not enabled. The bitmap enables configurations of up to 4 repetitions with different/flexible time gaps to support Doppler characteristics estimation in different scenarios (including with and/or without intra-slot frequency hopping). For example, the time gap between the first and second repetitions of the SRS is configured as time gap=1 OFDM symbol in the bitmap (e.g., the SRS symbols for the first and second repetitions are indicated by adjacent bits in the bitmap), whereas the time gap between the second and third repetitions of the SRS is configured as time gap=5 in the bitmap (e.g., the SRS symbols for the second and third repetitions are indicated by bits in the bitmap that are spaced apart by 4 bits). The SRS repetitions in the example intra-slot time domain SRS pattern configuration 720 may be used for Doppler correlation estimation and Doppler shift estimation (estimation of these two Doppler characteristics can be decoupled and based on two different repetitions of SRS symbols and the time gap between different SRS repetitions can be optimized to support reliable and accurate Doppler characteristics estimation and can be adaptively and flexibly configured per scenario with the proposed approach).

FIG. 7E illustrates an example intra-slot time domain SRS pattern configuration 725. The bitmap for the example intra-slot time domain SRS pattern configuration 725 may be configured as 00100001100000. In the example intra-slot time domain SRS pattern configuration 725, an Ns=3, R=2 combination is assumed to be configured via the bitmap and R=2 combination. This is not a trivial combination of Ns and R and it cannot follow the same straight forward interpretation as with the existing SRS configuration options where Ns should be always an integer multiplication of R. Thus, this configuration combination requires a complimentary definition for its interpretation. This combination may be interpreted as 2 repetitions only on the first two SRS symbols in the bitmap and no repetitions for the remaining third SRS symbol in the bitmap. Intra-slot frequency hopping may be enabled in this case (first intra slot frequency hop for the 2 repeated SRS symbols and the second intra slot frequency hop for the remaining not repeated SRS symbol) as is assumed in the example intra-slot time domain SRS pattern configuration 725. The first two SRS symbols may be configured with a time gap=5, and may be used for Doppler correlation estimation. The interpretation of this configuration (and other similar not trivial configurations/combinations of configured parameters) may be defined in a specification or standard, such as a 3GPP wireless communication standard.

FIG. 7F illustrates an example intra-slot time domain SRS pattern configuration 730. The bitmap for the example intra-slot time domain SRS pattern configuration 730 may be configured as 00110001100000. In the example intra-slot time domain SRS pattern configuration 730, an Ns=4, R=3 combination is assumed to be configured via the bitmap and R=3 combination. This combination may be interpreted as 3 repetitions only on the first three SRS symbols in the bitmap and no repetitions for the remaining fourth SRS symbol in the bitmap. Similarly to 7E example, intra-slot frequency hopping may be enabled in this case (first intra slot frequency hop for the 3 repeated SRS symbols and the second intra slot frequency hop for the remaining not repeated SRS symbol) as is assumed in the example intra-slot time domain SRS pattern configuration 730. The first three SRS symbols may be configured with multiple different time gaps (or, alternatively, multiple time gaps of the same size). For example, the time gap between the first and second repetitions may be time gap=1, and the time gap between the second and third repetitions may be time gap=5. The repetitions in the first three SRS symbols may be used for Doppler correlation estimation and Doppler shift estimation (will be done only on the first frequency hop). The interpretation of this configuration (and other similar not trivial configurations/combinations of configured parameters) may be defined in a specification or standard, such as a 3GPP wireless communication standard.

As indicated above, FIGS. 7A-7F are provided as examples. Other examples may differ from what is described with regard to FIGS. 7A-7F.

Figure 8:
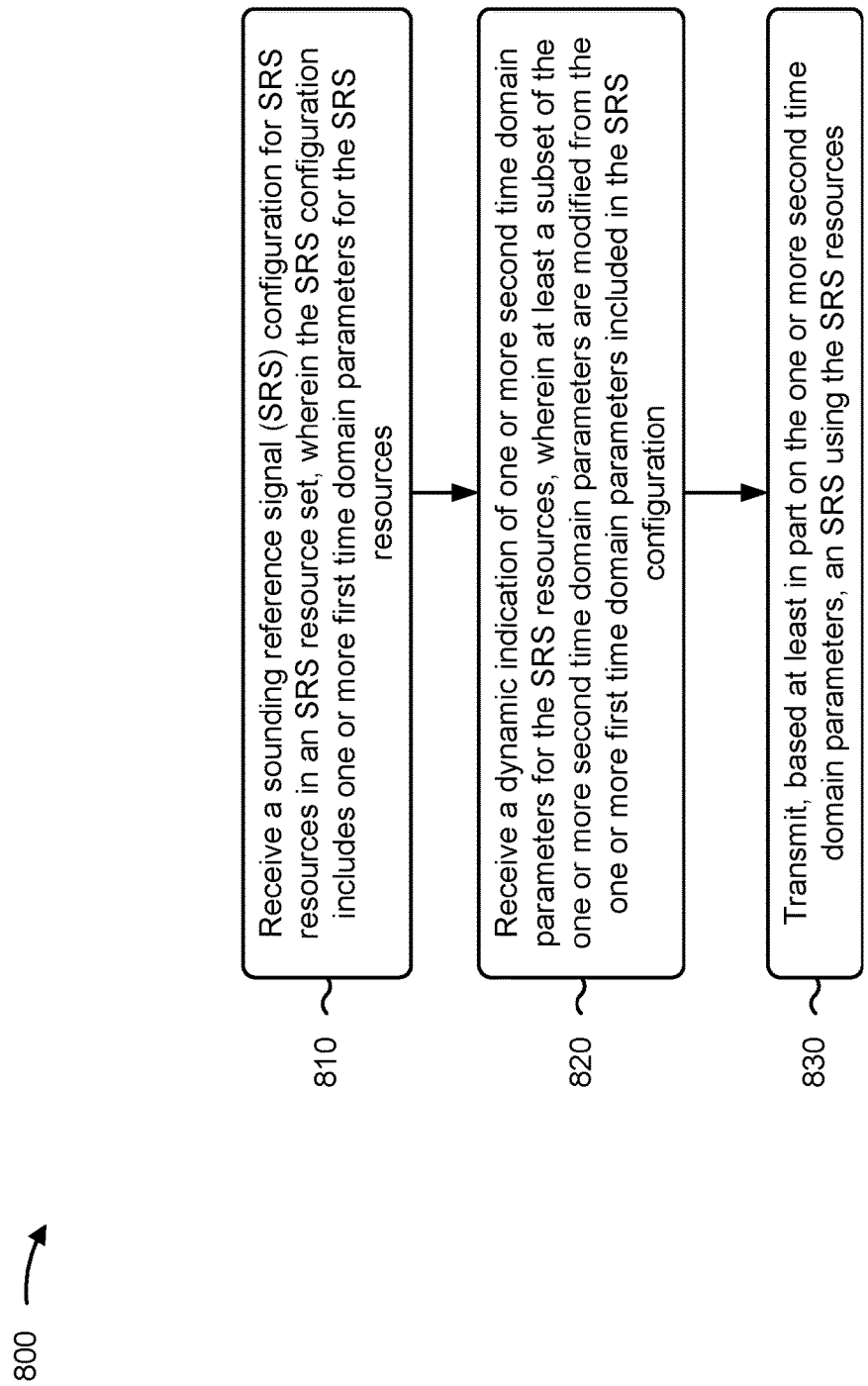
FIGS. 8 and 9 are diagrams illustrating example processes associated with dynamic adaptation of SRS time domain parameters, in accordance with the present disclosure.

FIG. 8 is a diagram illustrating an example process 800 performed, for example, by a UE, in accordance with the present disclosure. Example process 800 is an example where the UE (e.g., UE 120) performs operations associated with dynamic adaptation of SRS time domain parameters.

As shown in FIG. 8, in some aspects, process 800 may include receiving an SRS configuration for SRS resources included in an SRS resource set, wherein the SRS configuration includes one or more first time domain parameters for the SRS resources (block 810). For example, the UE (e.g., using communication manager 140 and/or reception component 1002, depicted in FIG. 10) may receive an SRS configuration for SRS resources included in an SRS resource set, as described herein. In some aspects, the SRS configuration includes one or more first time domain parameters for the SRS resources.

As further shown in FIG. 8, in some aspects, process 800 may include receiving a dynamic indication of one or more second time domain parameters for the SRS resources, wherein at least a subset of the one or more second time domain parameters are modified from the one or more first time domain parameters included in the SRS configuration (block 820). For example, the UE (e.g., using communication manager 140 and/or reception component 1002, depicted in FIG. 10) may receive a dynamic indication of one or more second time domain parameters for the SRS resources, as described herein. In some aspects, at least a subset of the one or more second time domain parameters are modified from the one or more first time domain parameters included in the SRS configuration.

As further shown in FIG. 8, in some aspects, process 800 may include transmitting, based at least in part on the one or more second time domain parameters, an SRS using the SRS resources (block 830). For example, the UE (e.g., using communication manager 140 and/or transmission component 1004, depicted in FIG. 10) may transmit, based at least in part on the one or more second time domain parameters, an SRS using the SRS resources, as described herein.

Process 800 may include additional aspects, such as any single aspect or any combination of aspects described below and/or in connection with one or more other processes described elsewhere herein.

In a first aspect, the SRS comprises a periodic SRS, a semi-persistent SRS, or an aperiodic SRS.

In a second aspect, alone or in combination with the first aspect, the one or more second time domain parameters comprise at least one of one or more intra-slot time domain pattern related parameters, or one or more inter-slot time domain pattern related parameters.

In a third aspect, alone or in combination with one or more of the first and second aspects, the dynamic indication of the one or more second time domain parameters comprises a bitmap indicating a plurality of intra-slot SRS symbol locations for the SRS resources, wherein the one or more first time domain parameters are indicated in another bitmap in the SRS configuration.

In a fourth aspect, alone or in combination with one or more of the first through third aspects, each bit in the bitmap corresponds to a respective OFDM symbol in a slot associated with the SRS resources, wherein the plurality of intra-slot SRS symbol locations for the SRS resources correspond to associated OFDM symbol indexes that are based on a position of non-zero valued bits, associated with the plurality of intra-slot SRS symbol locations, in the bitmap.

In a fifth aspect, alone or in combination with one or more of the first through fourth aspects, the bitmap indicates non-uniform time gaps for the plurality of intra-slot SRS symbol locations for the SRS resources, and the non-uniform time gaps are capable of being arbitrarily configured.

In a sixth aspect, alone or in combination with one or more of the first through fifth aspects, the bitmap indicates three intra-slot SRS symbol locations from the plurality of intra-slot SRS symbol locations for the SRS resources.

In a seventh aspect, alone or in combination with one or more of the first through sixth aspects, the three intra-slot SRS symbol locations are configured for three SRS transmissions.

In an eighth aspect, alone or in combination with one or more of the first through seventh aspects, the one or more second time domain parameters comprise at least one of a modified starting position for a first SRS symbol of the SRS resources, a modified number of symbols that can be occupied by the SRS resources or a modified periodicity and slot offset for the SRS.

In a ninth aspect, alone or in combination with one or more of the first through eighth aspects, the SRS configuration is indicated in an RRC communication, and the one or more second time domain parameters are indicated in a dynamic control signaling indication that includes at least one of a MAC-CE indication, or a DCI indication.

In a tenth aspect, alone or in combination with one or more of the first through ninth aspects, the SRS comprises at least one of a codebook based SRS, a non-codebook based SRS, or an antenna switching SRS, and the one or more second time domain parameters enable combining of channel sounding and CSI estimation procedures with complementary Doppler characteristics estimation based on same resources.

In an eleventh aspect, alone or in combination with one or more of the first through tenth aspects, the MAC-CE indication comprises a MAC-CE based reconfiguration indication, wherein the one or more second time domain parameters are explicitly indicated in the MAC-CE based reconfiguration indication.

In a twelfth aspect, alone or in combination with one or more of the first through eleventh aspects, the SRS configuration comprises a first SRS configuration that is included among a plurality of SRS configurations configured to the UE and associated with the SRS resource set, wherein the plurality of SRS configurations are indicated in the RRC communication, wherein a first MAC-CE indication activates the first SRS configuration, and wherein the MAC-CE indication comprises a second MAC-CE indication that indicates a second SRS configuration among the plurality of SRS configurations, wherein the one or more second time domain parameters are indicated in the second SRS configuration.

In a thirteenth aspect, alone or in combination with one or more of the first through twelfth aspects, the dynamic control signaling communication comprises a non PDSCH scheduling DCI communication having a format 1_1 or a format 1_2.

In a fourteenth aspect, alone or in combination with one or more of the first through thirteenth aspects, the one or more second time domain parameters are explicitly indicated by one or more repurposed DCI bit fields in the DCI communication.

In a fifteenth aspect, alone or in combination with one or more of the first through fourteenth aspects, the one or more second time domain parameters are implicitly indicated in the DCI communication.

In a sixteenth aspect, alone or in combination with one or more of the first through fifteenth aspects, the dynamic control signaling communication comprises a non-scheduling DCI communication having a dedicated format specifically for dynamic SRS parameters indication.

In a seventeenth aspect, alone or in combination with one or more of the first through sixteenth aspects, the dynamic control signaling communication comprises a non PUSCH scheduling DCI communication having a format 0_1 or a format 0_2, wherein the one or more second time domain parameters are indicated by one or more repurposed DCI bit fields in the DCI communication.

In an eighteenth aspect, alone or in combination with one or more of the first through seventeenth aspects, the dynamic control signaling communication comprises a PUSCH or a PDSCH scheduling DCI communication that triggers transmission of an aperiodic SRS associated with an aperiodic SRS resource set.

In a nineteenth aspect, alone or in combination with one or more of the first through eighteenth aspects, the one or more second time domain parameters are associated with or indicated by a triggered SRS trigger state indicated by a corresponding DCI field in the scheduling DCI communication, where the DCI field conveys a codepoint linked to the SRS trigger state that is associated with the aperiodic SRS resource set, where the SRS trigger state is included among a plurality of SRS trigger states associated with the SRS resource set, and where each SRS trigger state of the plurality of SRS trigger states is associated with a respective SRS configuration.

In a twentieth aspect, alone or in combination with one or more of the first through nineteenth aspects, process 800 includes receiving a MAC-CE communication that activates an aperiodic SRS trigger state from a plurality of SRS trigger states that are associated with the aperiodic SRS resource set, wherein one or more of the plurality of SRS trigger states are associated with a different SRS configuration, wherein the scheduling DCI communication triggers transmission of the SRS based at least in part on the aperiodic SRS trigger state, and wherein the SRS includes an aperiodic SRS.

In a twenty-first aspect, alone or in combination with one or more of the first through twentieth aspects, the dynamic control signaling communication includes an indication of one or more modified frequency domain parameters associated with the SRS resource set.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
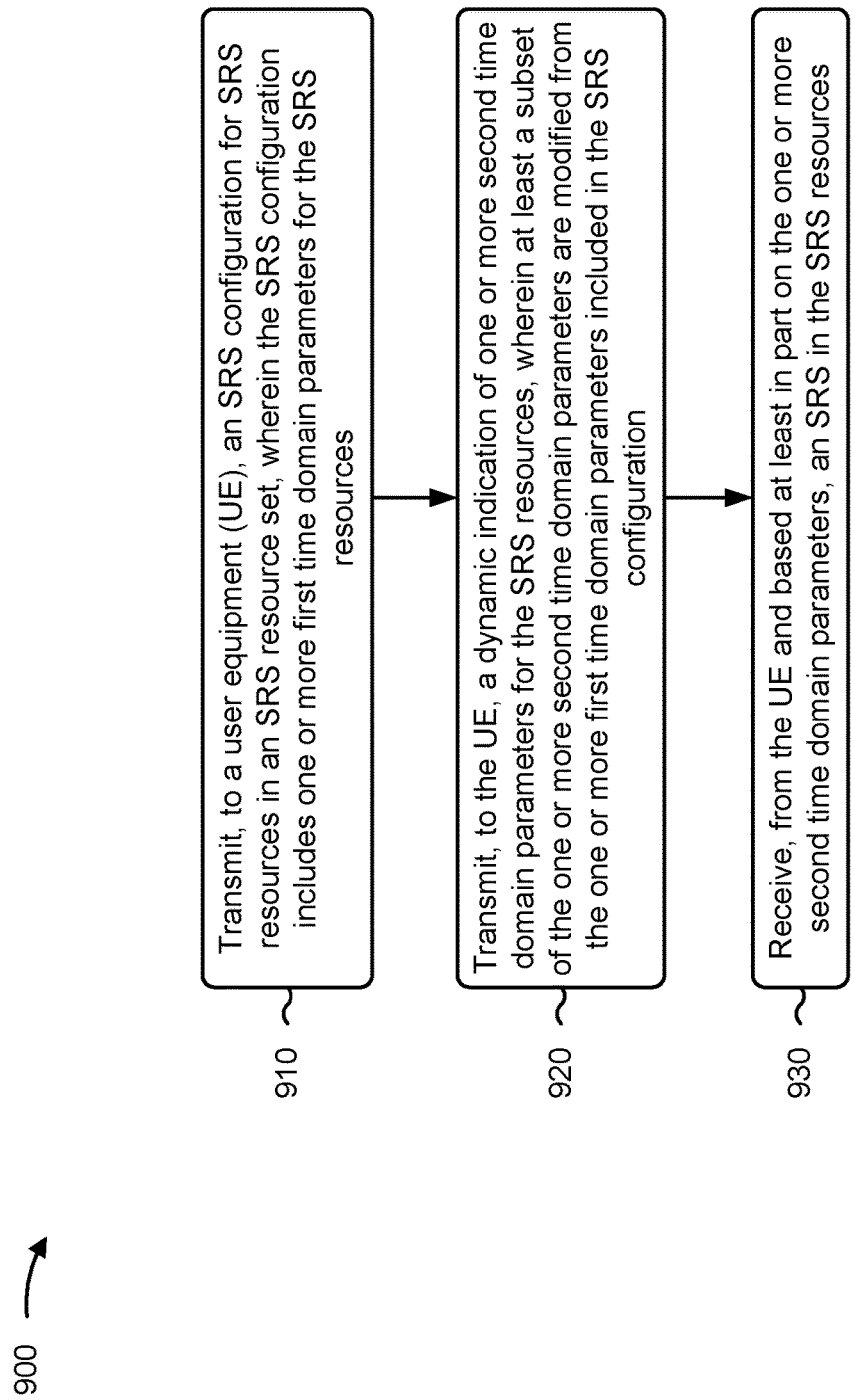

FIG. 9 is a diagram illustrating an example process 900 performed, for example, by a network node, in accordance with the present disclosure. Example process 900 is an example where the network node (e.g., a base station 110, a CU 310, a DU 330, an RU 340, a network node 605) performs operations associated with dynamic adaptation of SRS time domain parameters.

As shown in FIG. 9, in some aspects, process 900 may include transmitting, to a UE, an SRS configuration for SRS resources included in an SRS resource set, wherein the SRS configuration includes one or more first time domain parameters for the SRS resources (block 910). For example, the network node (e.g., using communication manager 150 and/or transmission component 1104, depicted in FIG. 11) may transmit, to a user UE, an SRS configuration for SRS resources included in an SRS resource set, as described herein. In some aspects, the SRS configuration includes one or more first time domain parameters for the SRS resources.

As further shown in FIG. 9, in some aspects, process 900 may include transmitting, to the UE, a dynamic indication of one or more second time domain parameters for the SRS resources, wherein at least a subset of the one or more second time domain parameters are modified from the one or more first time domain parameters included in the SRS configuration (block 920). For example, the network node (e.g., using communication manager 150 and/or transmission component 1104, depicted in FIG. 1) may transmit, to the UE, a dynamic indication of one or more second time domain parameters for the SRS resources, as described herein. In some aspects, at least a subset of the one or more second time domain parameters are modified from the one or more first time domain parameters included in the SRS configuration.

As further shown in FIG. 9, in some aspects, process 900 may include receiving, from the UE and based at least in part on the one or more second time domain parameters, an SRS in the SRS resources (block 930). For example, the network node (e.g., using communication manager 150 and/or reception component 1102, depicted in FIG. 11) may receive, from the UE and based at least in part on the one or more second time domain parameters, an SRS in the SRS resources included, as described above.

Process 900 may include additional aspects, such as any single aspect or any combination of aspects described below and/or in connection with one or more other processes described elsewhere herein.

In a first aspect, the SRS comprises a periodic SRS, a semi-persistent SRS, or an aperiodic SRS.

In a second aspect, alone or in combination with the first aspect, the one or more second time domain parameters comprise at least one of one or more intra-slot time domain pattern related parameters, or one or more inter-slot time domain pattern related parameters.

In a third aspect, alone or in combination with one or more of the first and second aspects, the dynamic indication of the one or more second time domain parameters comprises a bitmap indicating a plurality of intra-slot SRS symbol locations for the SRS resources.

In a fourth aspect, alone or in combination with one or more of the first through third aspects, each bit in the bitmap corresponds to a respective OFDM symbol in a slot associated with the SRS resources, wherein the plurality of intra-slot SRS symbol locations for the SRS resources correspond to associated OFDM symbol indexes that are based on a position of non-zero valued bits, associated with the plurality of intra-slot SRS symbol locations, in the bitmap.

In a fifth aspect, alone or in combination with one or more of the first through fourth aspects, the bitmap indicates non-uniform time gaps for the plurality of intra-slot SRS symbol locations in the SRS resources, and the non-uniform time gaps are capable of being arbitrarily configured.

In a sixth aspect, alone or in combination with one or more of the first through fifth aspects, the bitmap indicates three intra-slot SRS symbol locations from the plurality of intra-slot SRS symbol locations for the SRS resources.

In a seventh aspect, alone or in combination with one or more of the first through sixth aspects, the three intra-slot SRS symbol locations are configured for three SRS transmissions.

In an eighth aspect, alone or in combination with one or more of the first through seventh aspects, the one or more second time domain parameters comprise at least one of a modified starting position for a first SRS symbol of the SRS resources, a modified number of symbols that can be occupied by the SRS resources, or a modified periodicity for the SRS.

In a ninth aspect, alone or in combination with one or more of the first through eighth aspects, the SRS configuration is indicated in an RRC communication, and the one or more second time domain parameters are indicated in a dynamic control signaling indication that is included in at least one of a MAC-CE indication, or a DCI communication.

In a tenth aspect, alone or in combination with one or more of the first through ninth aspects, the SRS comprises at least one of a codebook based SRS, a non-codebook based SRS, or an antenna switching SRS, and the one or more second time domain parameters enable combining of channel sounding and CSI estimation procedures with complementary Doppler characteristics estimation based on same resources.

In an eleventh aspect, alone or in combination with one or more of the first through tenth aspects, the MAC-CE indication comprises a MAC-CE based reconfiguration indication, wherein the one or more second time domain parameters are explicitly indicated in the MAC-CE based reconfiguration indication.

In a twelfth aspect, alone or in combination with one or more of the first through eleventh aspects, the SRS configuration comprises a first SRS configuration that is included among a plurality of SRS configurations configured to the UE and associated with the SRS resource set, wherein the plurality of SRS configurations are indicated in the RRC communication, wherein a first MAC-CE indication activates the first SRS configuration, wherein the MAC-CE indication comprises a second MAC-CE indication that indicates a second SRS configuration among the plurality of SRS configurations, and wherein the one or more second time domain parameters are indicated in the second SRS configuration.

In a thirteenth aspect, alone or in combination with one or more of the first through twelfth aspects, the dynamic control signaling communication comprises a non PDSCH scheduling DCI communication having a format 1_1 or a format 1_2.

In a fourteenth aspect, alone or in combination with one or more of the first through thirteenth aspects, the one or more second time domain parameters are explicitly indicated by one or more repurposed DCI bit fields in the DCI communication.

In a fifteenth aspect, alone or in combination with one or more of the first through fourteenth aspects, the one or more second time domain parameters are implicitly indicated in the DCI communication.

In a sixteenth aspect, alone or in combination with one or more of the first through fifteenth aspects, the dynamic control signaling communication comprises a non-scheduling DCI communication having a dedicated format specifically for dynamic SRS parameters indication.

In a seventeenth aspect, alone or in combination with one or more of the first through sixteenth aspects, the dynamic control signaling communication comprises a non PUSCH scheduling DCI communication having a format 0_1 or a format 0_2, wherein the one or more second time domain parameters are indicated by one or more repurposed DCI bit fields in the DCI communication.

In an eighteenth aspect, alone or in combination with one or more of the first through seventeenth aspects, the dynamic control signaling communication comprises a PUSCH or a PDSCH scheduling DCI communication that triggers transmission of an aperiodic SRS associated with an aperiodic SRS resource set.

In a nineteenth aspect, alone or in combination with one or more of the first through eighteenth aspects, the one or more second time domain parameters are associated with or indicated by a triggered SRS trigger state indicated by a corresponding DCI field in the scheduling DCI communication, wherein the DCI field conveys a codepoint linked to the SRS trigger state that is associated with the aperiodic SRS resource set, wherein the SRS trigger state is included among a plurality of SRS trigger states associated with the aperiodic SRS resource set, and wherein each SRS trigger state of the plurality of SRS trigger states is associated with a respective SRS configuration.

In a twentieth aspect, alone or in combination with one or more of the first through nineteenth aspects, process 900 includes transmitting a MAC-CE communication that activates an aperiodic SRS trigger state from a plurality of SRS trigger states that are associated with the aperiodic SRS resource set, wherein one or more of the plurality of SRS trigger states are associated with a different SRS configuration, wherein the scheduling DCI communication triggers transmission of the SRS based at least in part on the aperiodic SRS trigger state, and wherein the SRS includes an aperiodic SRS.

In a twenty-first aspect, alone or in combination with one or more of the first through twentieth aspects, the dynamic control signaling communication includes a dynamic indication of one or more modified frequency domain parameters associated with the SRS resource set.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
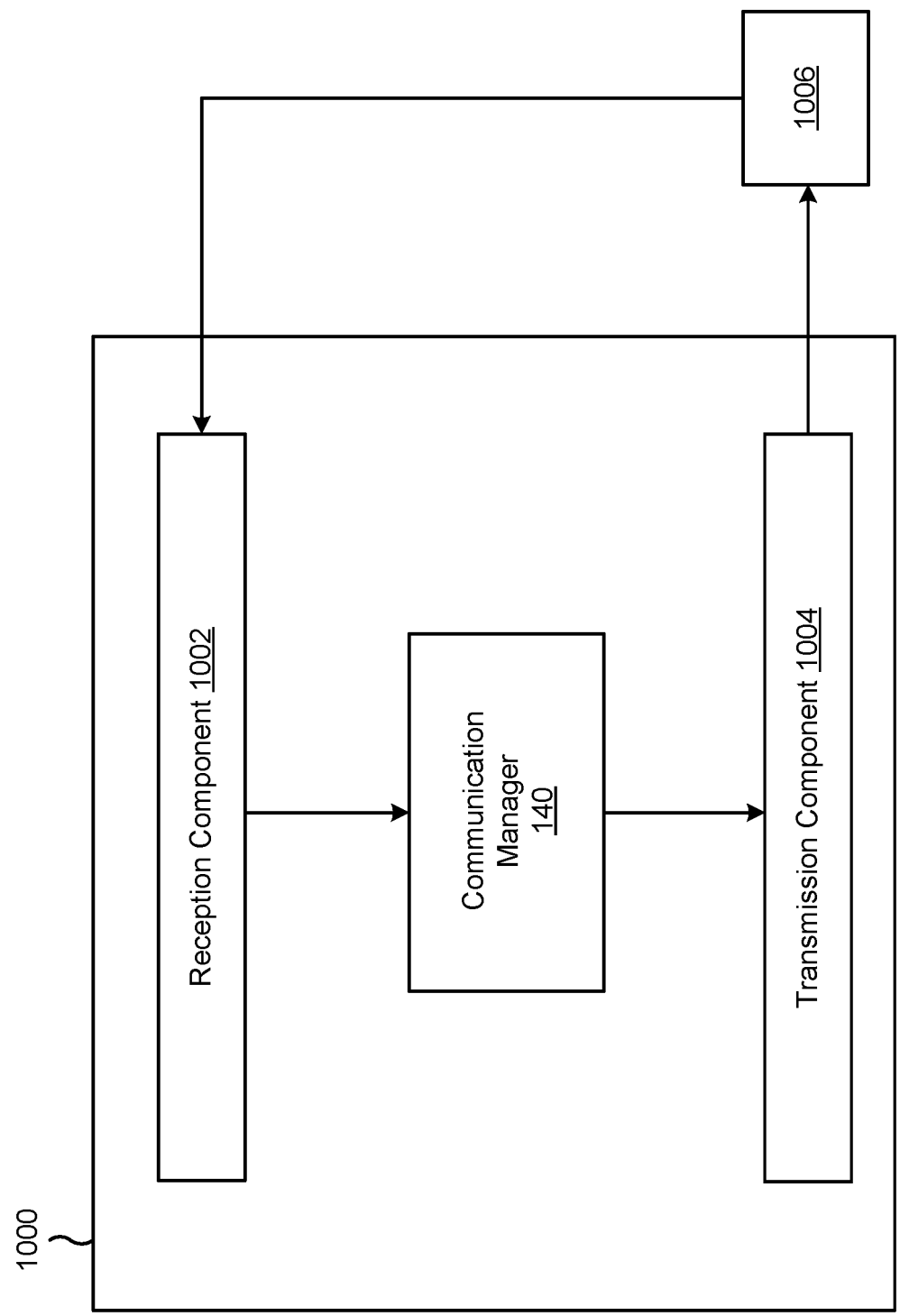
FIGS. 10 and 11 are diagrams of example apparatuses for wireless communication, in accordance with the present disclosure.

FIG. 10 is a diagram of an example apparatus 1000 for wireless communication. The apparatus 1000 may be a UE (e.g., a UE 120), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140.

In some aspects, the apparatus 1000 may be configured to perform one or more operations described herein in connection with FIGS. 6-7F. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive (e.g., from the apparatus 1006) an SRS configuration for SRS resources included in an SRS resource set. The SRS configuration includes one or more first time domain parameters for the SRS resources. The reception component 1002 may receive (e.g., from the apparatus 1006) a dynamic indication of one or more second time domain parameters for the SRS resources. At least a subset of the one or more second time domain parameters are modified from the one or more first time domain parameters included in the SRS configuration. The transmission component 1004 may transmit (e.g., to the apparatus 1006), based at least in part on the one or more second time domain parameters, an SRS using the SRS resources included in the SRS resource set.

The reception component 1002 may receive (e.g., from the apparatus 1006) a MAC-CE communication that activates an aperiodic SRS trigger state from a plurality of SRS trigger states that are associated with the aperiodic SRS resource set. The one or more of the plurality of SRS trigger states are associated with a different SRS configuration. The scheduling DCI communication triggers transmission of the SRS based at least in part on the aperiodic SRS trigger state, and the SRS includes an aperiodic SRS.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
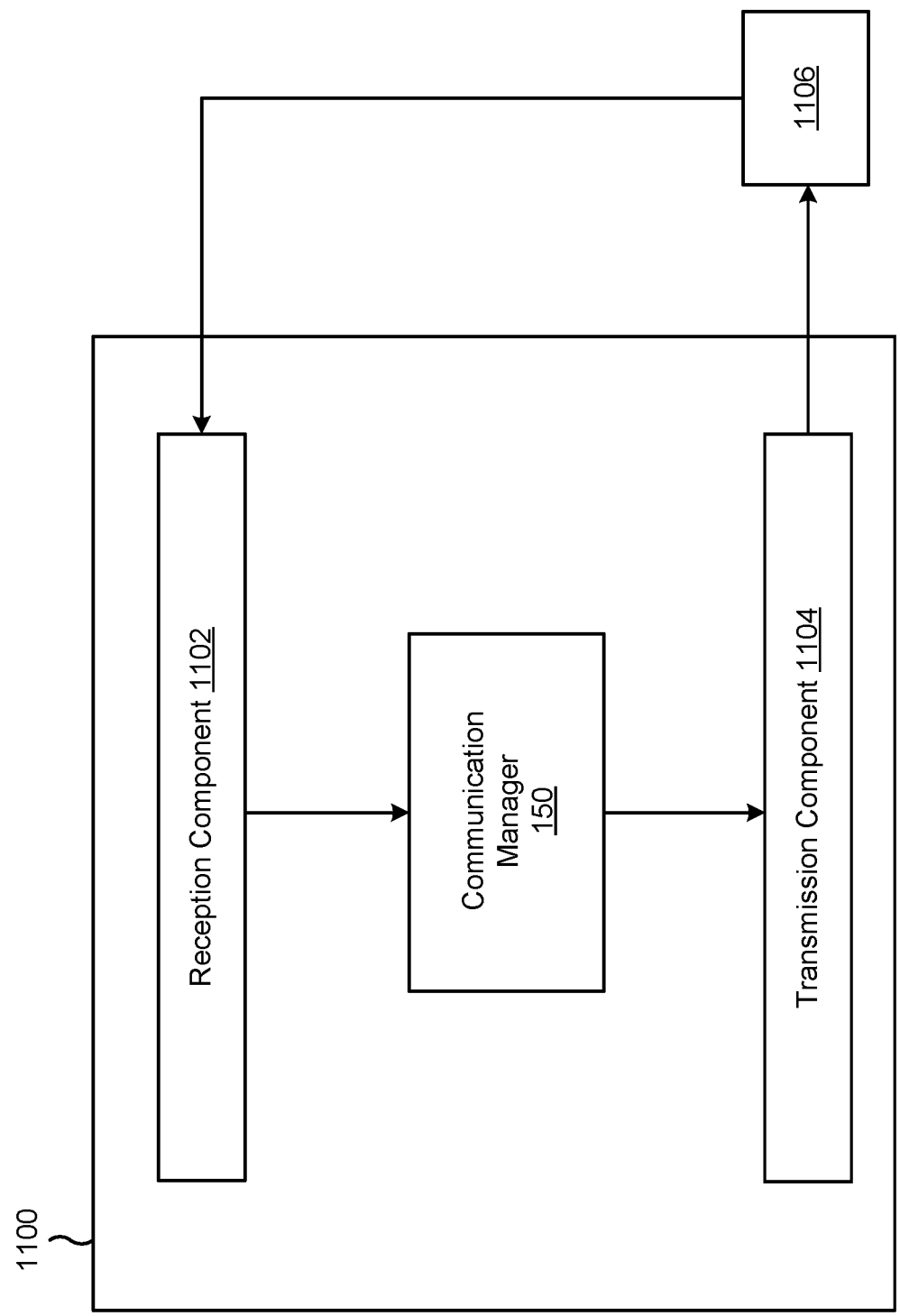

FIG. 11 is a diagram of an example apparatus 1100 for wireless communication. The apparatus 1100 may be a network node (e.g., a base station 110, a CU 310, a DU 330, an RU 340, a network node 605), or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150.

In some aspects, the apparatus 1100 may be configured to perform one or more operations described herein in connection with FIGS. 6-7F. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit (e.g., to the apparatus 1106) an SRS configuration for SRS resources included in an SRS resource set. The SRS configuration includes one or more first time domain parameters for the SRS resources. The transmission component 1104 may transmit (e.g., to the apparatus 1106) a dynamic indication of one or more second time domain parameters for the SRS resources. At least a subset of the one or more second time domain parameters are modified from the one or more first time domain parameters included in the SRS configuration. The reception component 1102 may receive (e.g., from the apparatus 1106), based at least in part on the one or more second time domain parameters, an SRS in SRS resources included in the SRS resource set.

The transmission component 1104 may transmit (e.g., to the apparatus 1106) a MAC-CE communication that activates an aperiodic SRS trigger state from a plurality of SRS trigger states that are associated with the aperiodic SRS resource set. One or more of the plurality of SRS trigger states are associated with a different SRS configuration. The scheduling DCI communication triggers transmission of the SRS based at least in part on the aperiodic SRS trigger state. The SRS includes an aperiodic SRS.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving a sounding reference signal (SRS) configuration for SRS resources included in an SRS resource set, wherein the SRS configuration includes one or more first time domain parameters for the SRS resources; receiving a dynamic indication of one or more second time domain parameters for the SRS resources, wherein at least a subset of the one or more second time domain parameters are modified from the one or more first time domain parameters included in the SRS configuration; and transmitting, based at least in part on the one or more second time domain parameters, an SRS using the SRS resources.

Aspect 2: The method of Aspect 1, wherein the SRS comprises: a periodic SRS, a semi-persistent SRS, or an aperiodic SRS.

Aspect 3: The method of Aspect 1 or 2, wherein the one or more second time domain parameters comprise at least one of: one or more intra-slot time domain pattern related parameters, or one or more inter-slot time domain pattern related parameters.

Aspect 4: The method of one or more of Aspects 1-3, wherein the dynamic indication of the one or more second time domain parameters comprises: a bitmap indicating a plurality of intra-slot SRS symbol locations for the SRS resources; and wherein the one or more first time domain parameters are indicated in another bitmap in the SRS configuration.

Aspect 5: The method of Aspect 4, wherein each bit in the bitmap corresponds to a respective orthogonal frequency division multiplexing (OFDM) symbol in a slot associated with the SRS resources, wherein the plurality of intra-slot SRS symbol locations for the SRS resources correspond to associated OFDM symbol indexes that are based on a position of non-zero valued bits, associated with the plurality of intra-slot SRS symbol locations, in the bitmap.

Aspect 6: The method of Aspect 5, wherein the bitmap indicates non-uniform time gaps for the plurality of intra-slot SRS symbol locations for the SRS resources, and wherein the non-uniform time gaps are capable of being arbitrarily configured.

Aspect 7: The method of one or more of Aspects 4-6, wherein the bitmap indicates three intra-slot SRS symbol locations from the plurality of intra-slot SRS symbol locations for the SRS resources.

Aspect 8: The method of Aspect 7, wherein the three intra-slot SRS symbol locations are configured for three SRS transmissions.

Aspect 9: The method of one or more of Aspects 1-8, wherein the one or more second time domain parameters comprise at least one of: a modified starting position for a first SRS symbol of the SRS resources, a modified number of symbols that can be occupied by the SRS resources, or a modified periodicity and slot offset for the SRS.

Aspect 10: The method of one or more of Aspects 1-9, wherein the SRS configuration is indicated in a radio resource control (RRC) communication; and wherein the one or more second time domain parameters are indicated in a dynamic control signaling indication that includes at least one of: a medium access control (MAC) control element (MAC-CE) indication, or a downlink control information (DCI) indication.

Aspect 11: The method of Aspect 10, wherein the SRS comprises at least one of a codebook based SRS, a non-codebook based SRS, or an antenna switching SRS; and wherein the one or more second time domain parameters enable combining of channel sounding and channel state information (CSI) estimation procedures with complementary Doppler characteristics estimation based on same resources.

Aspect 12: The method of Aspect 10 or 11, wherein the MAC-CE indication comprises: a MAC-CE based reconfiguration indication, wherein the one or more second time domain parameters are explicitly indicated in the MAC-CE based reconfiguration indication.

Aspect 13: The method of one or more of Aspects 10-13, wherein the SRS configuration comprises a first SRS configuration that is included among a plurality of SRS configurations configured to the UE and associated with the SRS resource set, wherein the plurality of SRS configurations are indicated in the RRC communication; wherein a first MAC-CE indication activates the first SRS configuration; and wherein the MAC-CE indication comprises: a second MAC-CE indication that indicates a second SRS configuration among the plurality of SRS configurations, wherein the one or more second time domain parameters are indicated in the second SRS configuration.

Aspect 14: The method of Aspect 10, wherein the dynamic control signaling communication comprises: a non physical downlink shared channel (PDSCH) scheduling DCI communication having a format 1_1 or a format 1_2.

Aspect 15: The method of Aspect 14, wherein the one or more second time domain parameters are explicitly indicated by one or more repurposed DCI bit fields in the DCI communication.

Aspect 16: The method of Aspect 14 or 15, wherein the one or more second time domain parameters are implicitly indicated in the DCI communication.

Aspect 17: The method of one or more of Aspects 10-16, wherein the dynamic control signaling communication comprises: a non-scheduling DCI communication having a dedicated format specifically for dynamic SRS parameters indication.

Aspect 18: The method of one or more of Aspects 10-17, wherein the dynamic control signaling communication comprises: a non physical uplink shared channel (PUSCH) scheduling DCI communication having a format 0_1 or a format 0_2, wherein the one or more second time domain parameters are indicated by one or more repurposed DCI bit fields in the DCI communication.

Aspect 19: The method of one or more of Aspects 10-18, wherein the dynamic control signaling communication comprises: a physical uplink shared channel (PUSCH) or a physical downlink shared channel (PDSCH) scheduling DCI communication that triggers transmission of an aperiodic SRS associated with an aperiodic SRS resource set.

Aspect 20: The method of Aspect 19, wherein the one or more second time domain parameters are associated with or indicated by a triggered SRS trigger state indicated by a corresponding DCI field in the scheduling DCI communication, where the DCI field conveys a codepoint linked to the SRS trigger state that is associated with the aperiodic SRS resource set, and wherein the SRS trigger state is included among a plurality of SRS trigger states associated with the SRS resource set, and wherein each SRS trigger state of the plurality of SRS trigger states is associated with a respective SRS configuration.

Aspect 21: The method of Aspect 19 or 20, further comprising: receiving a medium access control (MAC) control element (MAC-CE) communication that activates an aperiodic SRS trigger state from a plurality of SRS trigger states that are associated with the aperiodic SRS resource set, wherein one or more of the plurality of SRS trigger states are associated with a different SRS configuration, wherein the scheduling DCI communication triggers transmission of the SRS based at least in part on the aperiodic SRS trigger state, and wherein the SRS includes an aperiodic SRS.

Aspect 22: The method of one or more of Aspects 10-21, wherein the dynamic control signaling communication includes an indication of one or more modified frequency domain parameters associated with the SRS resource set.

Aspect 23: A method of wireless communication performed by a network node, comprising: transmitting, to a user equipment (UE), a sounding reference signal (SRS) configuration for SRS resources included in an SRS resource set, wherein the SRS configuration includes one or more first time domain parameters for the SRS resources; transmitting, to the UE, a dynamic indication of one or more second time domain parameters for the SRS resources, wherein at least a subset of the one or more second time domain parameters are modified from the one or more first time domain parameters included in the SRS configuration; and receiving, from the UE and based at least in part on the one or more second time domain parameters, an SRS in the SRS resources.

Aspect 24: The method of Aspect 23, wherein the SRS comprises: a periodic SRS, a semi-persistent SRS, or an aperiodic SRS.

Aspect 25: The method of Aspect 23 or 24, wherein the one or more second time domain parameters comprise at least one of: one or more intra-slot time domain pattern related parameters, or one or more inter-slot time domain pattern related parameters.

Aspect 26: The method of one or more of Aspects 23-25, wherein the dynamic indication of the one or more second time domain parameters comprises: a bitmap indicating a plurality of intra-slot SRS symbol locations for the SRS resources.

Aspect 27: The method of Aspect 26, wherein each bit in the bitmap corresponds to a respective orthogonal frequency division multiplexing (OFDM) symbol in a slot associated with the SRS resources, wherein the plurality of intra-slot SRS symbol locations for the SRS resources correspond to associated OFDM symbol indexes that are based on a position of non-zero valued bits, associated with the plurality of intra-slot SRS symbol locations, in the bitmap.

Aspect 28: The method of Aspect 27, wherein the bitmap indicates non-uniform time gaps for the plurality of intra-slot SRS symbol locations in the SRS resources, and wherein the non-uniform time gaps are capable of being arbitrarily configured.

Aspect 29: The method of one or more of Aspects 26-28, wherein the bitmap indicates three intra-slot SRS symbol locations from the plurality of intra-slot SRS symbol locations for the SRS resources.

Aspect 30: The method of Aspect 29, wherein the three intra-slot SRS symbol locations are configured for three SRS transmissions.

Aspect 31: The method of one or more of Aspects 23-30, wherein the one or more second time domain parameters comprise at least one of: a modified starting position for a first SRS symbol of the SRS resources, a modified number of symbols that can be occupied by the SRS resources, or a modified periodicity for the SRS.

Aspect 32: The method of one or more of Aspects 23-31, wherein the SRS configuration is indicated in a radio resource control (RRC) communication; and wherein the one or more second time domain parameters are indicated in a dynamic control signaling indication that is included in at least one of: a medium access control (MAC) control element (MAC-CE) indication, or a downlink control information (DCI) communication.

Aspect 33: The method of Aspect 32, wherein the SRS comprises at least one of a codebook based SRS, a non-codebook based SRS, or an antenna switching SRS; and wherein the one or more second time domain parameters enable combining of channel sounding and channel state information (CSI) estimation procedures with complementary Doppler characteristics estimation based on same resources.

Aspect 34: The method of Aspect 32 or 33, wherein the MAC-CE indication comprises: a MAC-CE based reconfiguration indication, wherein the one or more second time domain parameters are explicitly indicated in the MAC-CE based reconfiguration indication.

Aspect 35: The method of one or more of Aspects 32-34, wherein the SRS configuration comprises a first SRS configuration that is included among a plurality of SRS configurations configured to the UE and associated with the SRS resource set, wherein the plurality of SRS configurations are indicated in the RRC communication; wherein a first MAC-CE indication activates the first SRS configuration; and wherein the MAC-CE indication comprises: a second MAC-CE indication that indicates a second SRS configuration among the plurality of SRS configurations, wherein the one or more second time domain parameters are indicated in the second SRS configuration.

Aspect 36: The method of one or more of Aspects 32-35, wherein the dynamic control signaling communication comprises: a non physical downlink shared channel (PDSCH) scheduling DCI communication having a format 1_1 or a format 1_2.

Aspect 37: The method of Aspect 36, wherein the one or more second time domain parameters are explicitly indicated by one or more repurposed DCI bit fields in the DCI communication.

Aspect 38: The method of Aspect 36 or 37, wherein the one or more second time domain parameters are implicitly indicated in the DCI communication.

Aspect 39: The method of one or more of Aspects 32-38, wherein the dynamic control signaling communication comprises: a non-scheduling DCI communication having a dedicated format specifically for dynamic SRS parameters indication.

Aspect 40: The method of one or more of Aspects 32-39, wherein the dynamic control signaling communication comprises: a non physical uplink shared channel (PUSCH) scheduling DCI communication having a format 0_1 or a format 0_2, wherein the one or more second time domain parameters are indicated by one or more repurposed DCI bit fields in the DCI communication.

Aspect 41: The method of one or more of Aspects 32-40, wherein the dynamic control signaling communication comprises: a physical uplink shared channel (PUSCH) or a physical downlink shared channel (PDSCH) scheduling DCI communication that triggers transmission of an aperiodic SRS associated with an aperiodic SRS resource set.

Aspect 42: The method of Aspect 41, wherein the one or more second time domain parameters are associated with or indicated by a triggered SRS trigger state indicated by a corresponding DCI field in the scheduling DCI communication, where the DCI field conveys a codepoint linked to the SRS trigger state that is associated with the aperiodic SRS resource set, and wherein the SRS trigger state is included among a plurality of SRS trigger states associated with the aperiodic SRS resource set, and wherein each SRS trigger state of the plurality of SRS trigger states is associated with a respective SRS configuration.

Aspect 43: The method of Aspect 41 or 42, further comprising: transmitting a medium access control (MAC) control element (MAC-CE) communication that activates an aperiodic SRS trigger state from a plurality of SRS trigger states that are associated with the aperiodic SRS resource set, wherein one or more of the plurality of SRS trigger states are associated with a different SRS configuration, wherein the scheduling DCI communication triggers transmission of the SRS based at least in part on the aperiodic SRS trigger state, and wherein the SRS includes an aperiodic SRS.

Aspect 44: The method of one or more of Aspects 32-43, wherein the dynamic control signaling communication includes a dynamic indication of one or more modified frequency domain parameters associated with the SRS resource set.

Aspect 45: An apparatus for wireless communication at a device, comprising a processor; memory coupled with the processor; and instructions stored in the memory and executable by the processor to cause the apparatus to perform the method of one or more of Aspects 1-22.

Aspect 46: A device for wireless communication, comprising a memory and one or more processors coupled to the memory, the one or more processors configured to perform the method of one or more of Aspects 1-22.

Aspect 47: An apparatus for wireless communication, comprising at least one means for performing the method of one or more of Aspects 1-22.

Aspect 48: A non-transitory computer-readable medium storing code for wireless communication, the code comprising instructions executable by a processor to perform the method of one or more of Aspects 1-22.

Aspect 49: A non-transitory computer-readable medium storing a set of instructions for wireless communication, the set of instructions comprising one or more instructions that, when executed by one or more processors of a device, cause the device to perform the method of one or more of Aspects 1-22.

Aspect 50: An apparatus for wireless communication at a device, comprising a processor; memory coupled with the processor; and instructions stored in the memory and executable by the processor to cause the apparatus to perform the method of one or more of Aspects 23-44.

Aspect 51: A device for wireless communication, comprising a memory and one or more processors coupled to the memory, the one or more processors configured to perform the method of one or more of Aspects 23-44.

Aspect 52: An apparatus for wireless communication, comprising at least one means for performing the method of one or more of Aspects 23-44.

Aspect 53: A non-transitory computer-readable medium storing code for wireless communication, the code comprising instructions executable by a processor to perform the method of one or more of Aspects 23-44.

Aspect 54: A non-transitory computer-readable medium storing a set of instructions for wireless communication, the set of instructions comprising one or more instructions that, when executed by one or more processors of a device, cause the device to perform the method of one or more of Aspects 23-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b++b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving a sounding reference signal (SRS) configuration for SRS resources in an SRS resource set,
        wherein the SRS configuration includes one or more first time domain parameters for SRS resources included in the SRS resources, wherein the one or more first time domain parameters are indicated in a first bitmap in the SRS configuration;
    receiving a dynamic indication of one or more second time domain parameters for the SRS resources and the included in it SRS resources, wherein the dynamic indication of the one or more second time domain parameters comprises:
        a second bitmap indicating a plurality of intra-slot SRS symbol locations for the SRS resources;
        wherein the one or more first time domain parameters are indicated in another bitmap in the SRS configuration,
        wherein at least one of the one or more second time domain parameters are modified from the one or more first time domain parameters included in the SRS configuration; and
    transmitting, based at least in part on the one or more second time domain parameters, an SRS using the SRS resources.
2. The method of claim 1, wherein the SRS comprises:
    a periodic SRS,
    a semi-persistent SRS, or
    an aperiodic SRS.
3. The method of claim 1, wherein the one or more second time domain parameters comprise at least one of:
    one or more intra-slot time domain pattern related parameters, or
    one or more inter-slot time domain pattern related parameters.
4. The method of claim 1, wherein each bit in the second bitmap corresponds to a respective orthogonal frequency division multiplexing (OFDM) symbol in a slot associated with the SRS resources,
    wherein the plurality of intra-slot SRS symbol locations for the SRS resources correspond to associated OFDM symbol indexes that are based on a position of non-zero valued bits, associated with the plurality of intra-slot SRS symbol locations, in the second bitmap.
5. The method of claim 4, wherein the second bitmap indicates non-uniform time gaps for the plurality of intra-slot SRS symbol locations for the SRS resources, and wherein the non-uniform time gaps are capable of being arbitrarily configured.
6. The method of claim 4, wherein the second bitmap indicates three intra-slot SRS symbol locations from the plurality of intra-slot SRS symbol locations for the SRS resources.
7. The method of claim 6, wherein the three intra-slot SRS symbol locations are configured for three SRS repetitions.
8. The method of claim 1, wherein the one or more second time domain parameters comprise at least one of:
    a modified starting position for a first SRS symbol of the SRS resources,
    a modified number of symbols that can be occupied by the SRS resources, or
    a modified periodicity and slot offset for the SRS.
9. The method of claim 1, wherein the SRS configuration is indicated in a radio resource control (RRC) communication; and
    wherein the one or more second time domain parameters are indicated in a dynamic control signaling indication that includes at least one of:
        a medium access control (MAC) control element (MAC-CE) indication, or
        a downlink control information (DCI) indication.
10. The method of claim 9, wherein the SRS comprises at least one of a codebook based SRS, a non-codebook based SRS, or an antenna switching SRS; and
    wherein the one or more second time domain parameters enable combining of channel sounding and channel state information (CSI) estimation procedures with complementary Doppler characteristics estimation based on same resources.
11. The method of claim 9, wherein the MAC-CE indication comprises:
    a MAC-CE based reconfiguration indication,
        wherein the one or more second time domain parameters are explicitly indicated in the MAC-CE based reconfiguration indication.
12. The method of claim 9, wherein the SRS configuration comprises a first SRS configuration that is included among a plurality of SRS configurations configured to the UE and associated with the SRS resources,
    wherein the plurality of SRS configurations are indicated in the RRC communication;
    wherein a first MAC-CE indication activates the first SRS configuration; and
    wherein the MAC-CE indication comprises:
        a second MAC-CE indication that activates a second SRS configuration among the plurality of SRS configurations,
            wherein the one or more second time domain parameters are indicated in the second SRS configuration.

13. The method of claim 9, wherein the dynamic control signaling communication comprises:
a non physical downlink shared channel (PDSCH) scheduling DCI communication having a format 1_1 or a format 1_2.

14. The method of claim 13, wherein the one or more second time domain parameters are explicitly indicated by one or more repurposed DCI bit fields in the DCI communication.

15. The method of claim 13, wherein the one or more second time domain parameters are implicitly indicated in the DCI communication.

16. The method of claim 9, wherein the dynamic control signaling communication comprises:
a non-scheduling DCI communication having a dedicated format specifically for dynamic SRS parameters indication.

17. The method of claim 9, wherein the dynamic control signaling communication comprises:
a non physical uplink shared channel (PUSCH) scheduling DCI communication having a format 0_1 or a format 0_2,
wherein the one or more second time domain parameters are indicated by one or more repurposed DCI bit fields in the DCI communication.

18. The method of claim 9, wherein the dynamic control signaling communication comprises:
a physical uplink shared channel (PUSCH) or a physical downlink shared channel (PDSCH) scheduling DCI communication that triggers transmission of an aperiodic SRS associated with the triggered aperiodic SRS resource set identifier.

19. The method of claim 18, wherein the one or more second time domain parameters are associated with or indicated by a triggered SRS trigger state indicated by the corresponding DCI field in the scheduling DCI communication,
where the DCI field conveys a codepoint linked to the SRS trigger state that is associated with the aperiodic SRS resource set, and
wherein the SRS trigger state is included among a plurality of SRS trigger states associated with the SRS resource set, and
wherein each SRS trigger state of the plurality of SRS trigger states is associated with a respective SRS configuration.

20. The method of claim 18, further comprising:
receiving a medium access control (MAC) control element (MAC-CE) communication that activates one of SRS trigger states from a plurality of SRS trigger states that are associated with the aperiodic SRS resource set,
wherein one or more of the plurality of SRS trigger states are associated with a different SRS configuration,
wherein the scheduling DCI communication triggers transmission of the aperiodic SRS based at least in part on the SRS trigger state and SRS configuration associated with it.

21. The method of claim 9, wherein the dynamic control signaling communication includes an indication of one or more modified frequency domain parameters associated with the SRS resources.

22. A user equipment (UE) for wireless communication, comprising:
a memory; and
one or more processors, coupled to the memory, configured to:
receive a sounding reference signal (SRS) configuration for SRS resources in an SRS resource set,
wherein the SRS configuration includes one or more first time domain parameters for the SRS resources,
wherein the one or more first time domain parameters are indicated in a first bitmap in the SRS configuration;
receive a dynamic indication of one or more second time domain parameters for the SRS resource,
wherein the dynamic indication of the one or more second time domain parameters comprises:
a second bitmap indicating a plurality of intra-slot SRS symbol locations for the SRS resources,
wherein at least one of the one or more second time domain parameters are modified from the one or more first time domain parameters included in the SRS configuration; and
transmit, based at least in part on the one or more second time domain parameters, an SRS using the SRS resources.

23. The UE of claim 22, wherein the SRS configuration is indicated in a radio resource control (RRC) communication; and
wherein the one or more second time domain parameters are indicated in a dynamic control signaling indication that includes at least one of:
a medium access control (MAC) control element (MAC-CE) indication, or
a downlink control information (DCI) indication.

24. A non-transitory computer-readable medium storing a set of instructions for wireless communication, the set of instructions comprising:
one or more instructions that, when executed by one or more processors of a user equipment (UE), cause the UE to:
receive a sounding reference signal (SRS) configuration for SRS resources in an SRS resource set,
wherein the SRS configuration includes one or more first time domain parameters for the SRS resources,
wherein the one or more first time domain parameters are indicated in a first bitmap in the SRS configuration;
receive a dynamic indication of one or more second time domain parameters for the SRS resources,
wherein the dynamic indication of the one or more second time domain parameters comprises:
a bitmap indicating a plurality of intra-slot SRS symbol locations for the SRS resources,
wherein at least one of the one or more second time domain parameters are modified from the one or more first time domain parameters included in the SRS configuration; and
transmit, based at least in part on the one or more second time domain parameters, an SRS using the SRS resources.

25. The non-transitory computer-readable medium of claim 24, wherein the SRS configuration is indicated in a radio resource control (RRC) communication; and
wherein the one or more second time domain parameters are indicated in a dynamic control signaling indication that includes at least one of:
a medium access control (MAC) control element (MAC-CE) indication, or
a downlink control information (DCI) indication.

26. An apparatus for wireless communication, comprising:
- means for receiving a sounding reference signal (SRS) configuration for SRS resources included in an SRS resource set,
  - wherein the SRS configuration includes one or more first time domain parameters for the SRS resources, wherein the one or more first time domain parameters are indicated in a first bitmap in the SRS configuration;
- means for receiving a dynamic indication of one or more second time domain parameters for the SRS resources, wherein the dynamic indication of the one or more second time domain parameters comprises:
  - a second bitmap indicating a plurality of intra-slot SRS symbol locations for the SRS resources,
  - wherein at least one of the one or more second time domain parameters are modified from the one or more first time domain parameters included in the SRS configuration; and
- means for transmitting, based at least in part on the one or more second time domain parameters, an SRS using the SRS resources.

* * * * *